United States Patent [19]
Shrader et al.

[11] Patent Number: 5,521,963
[45] Date of Patent: May 28, 1996

[54] SYSTEM AND METHOD FOR USING INTEGRATED SERVICES DIGITAL NETWORKS (ISDN) AND THE CALL APPEARANCE CALL HANDLING (CACH) FEATURE OF ELECTRONIC KEY TELEPHONE SERVICE (EKTS) TECHNOLOGY FOR MOBILE SYSTEMS

[75] Inventors: David C. Shrader, Ft. Lauderdale; Gary L. Hitchcock, Parkland; Feza H. Buyukdura, Boca Raton; Edwin R. Ely, Coral Springs, all of Fla.

[73] Assignee: Siemens Stromberg-Carlson, Boca Raton, Fla.

[21] Appl. No.: 303,267

[22] Filed: Sep. 8, 1994

[51] Int. Cl.⁶ .................................................. H04Q 7/24
[52] U.S. Cl. ............................ 379/60; 370/60; 370/95.3; 379/58; 455/331
[58] Field of Search .................................... 370/60, 85.13, 370/85.14, 94.1, 95.3; 379/58, 59, 60, 61; 455/11.1, 17, 33.1, 33.2, 33.3, 52.1, 56.1, 62

[56] References Cited

U.S. PATENT DOCUMENTS

| | | | |
|---|---|---|---|
| 3,819,872 | 6/1974 | Hamrick | 179/41 |
| 4,659,878 | 4/1987 | Dinkins | 370/71 |
| 4,698,839 | 10/1987 | DeVaney et al. | 379/60 |
| 4,748,681 | 5/1988 | Schmidt | 455/33 |
| 4,829,554 | 5/1989 | Barnes et al. | 379/60 |
| 5,058,201 | 10/1991 | Ishii et al. | 455/33 |
| 5,095,531 | 3/1992 | Ito | 455/33.1 |
| 5,101,501 | 3/1992 | Gilhousen et al. | 455/33 |
| 5,226,045 | 7/1993 | Chuang | 370/95.3 |
| 5,265,150 | 11/1993 | Helmkamp et al. | 379/58 |
| 5,325,419 | 6/1994 | Connolly et al. | 379/60 |
| 5,363,369 | 11/1994 | Hemmady et al. | 370/60 |

FOREIGN PATENT DOCUMENTS

| | | |
|---|---|---|
| 0462727A2 | 12/1991 | European Pat. Off. . |
| 0472511A2 | 2/1992 | European Pat. Off. . |
| 0504122 | 9/1992 | European Pat. Off. . |
| 0544447 | 6/1993 | European Pat. Off. . |
| 4020375A1 | 6/1990 | Germany . |
| WO91/00657 | 1/1991 | WIPO . |
| WO91/18483 | 11/1991 | WIPO . |
| WO92/08290 | 5/1992 | WIPO . |
| WO92/10891 | 6/1992 | WIPO . |

OTHER PUBLICATIONS

Ghillebaert, "The Second Generation Cellular System" International Switching Symposium 1987, Mar. 15–20, 1987.

Weib, Wizgall, "System 900: The ISDN Approach to Cellular Mobile Radio", Electrical Communication, 1989, V.63, #4.

Ballard, Issenmann, Sanchez, "Cellular Mobile Radio as an Intelligent Network Application", Electrical Communication, 1989.

Primary Examiner—Curtis Kuntz
Assistant Examiner—William Cumming
Attorney, Agent, or Firm—Joseph S. Codispoti

[57] ABSTRACT

A mobile call processing methodology and concomitant system based on ISDN/CACH-EKTS technology which can broadcast incoming calls to base stations (e.g., 1050) and which uses the ISDN/CACH-EKTS bridging technology to handle base station handoff of an established call. Each mobile user (e.g., 1041, 1042) is assigned a unique EKTS directory number as well as a unique call appearance identifier, which allows for the handling of multiple call appearances of the unique DN on a single base station. For a given mobile communication application, the central office (e.g., 1014) treats the base station as an ISDN/CACH-EKTS terminal.

8 Claims, 19 Drawing Sheets

SYSTEM AND METHOD FOR USING INTEGRATED SERVICES DIGITAL NETWORKS (ISDN) AND THE CALL APPEARANCE CALL HANDLING (CACH) FEATURE OF ELECTRONIC KEY TELEPHONE SERVICE (EKTS) TECHNOLOGY FOR MOBILE SYSTEMS

BACKGROUND OF THE DISCLOSURE

1. Field of the Invention

This invention relates generally to a system and concomitant methodology for handling incoming calls to and outgoing calls from a mobile user; this invention relates, more particularly, to CACH-EKTS procedures and circuitry used with a central office and an associated base station to effect such handling.

2. Description of the Prior Art

A typical mobile system is composed of numerous mobile units, such as handsets operated by individual system users, which home-on an associated base station. Typically each base station serves a number of mobile units that lie within a simply connected geographical area—a cell—identified to that single base unit. Most of the current cellular mobile systems use a registration method to keep track of the locations of the mobile units. A specific base station serves as a controller for the units within an assigned cell. Each mobile unit is required to inform, that is, register with, the base station its location when the user moves from the original cell into a new cell. This registration process is typically accomplished automatically by the mobile unit, but the registration may also be effected manually by the user of the unit. The base station will, in turn, pass the registration information to the serving switching office. Since a conventional cellular mobile system generally covers a geographical area larger than a single switching office, the registration process requires the coordination among a plurality of switching offices, and such registration process may involve the use of centralized databases in the serving network to keep track of mobile unit locations.

Representative of the prior art in this area of technology is the digital mobile network configuration of the EWSD switching system supplied by the Siemens AG. In this EWSD configuration, a base station serving a cell is connected via a digital carrier, such as DS1, to a radio network controller which functions to off-load processing of the radio part of the call from the switching office. The radio network controller is further connected, also via digital carrier links, to conventional line/trunk groups interfacing a switch in the switching center which ultimately switches the call. A network management module for the radio subsystem, that is, base station and radio network controller, is coupled to the switches via an interposed processor which coordinates management activities. The mechanism provided by such an architecture is based on a centralized database which contains the mobile subscribers home information. The switches themselves have only temporary information about visiting subscribers at any particular instance. Using transaction capabilities over a common signaling network such as SS7, the information from the centralized databases is transferred to the switches when necessary to handle, for example, handoffs.

There are applications of mobile systems in which the use of multiple switching offices is not a strict requirement. The service area of a single switching office is, in these applications, sufficient for many practical situations such as wireless CENTREX. The type of switching office can then be a central office (CO) belonging to the public switching network.

In these limited service area applications, the use of centralized databases, the process of registration between the handset, base station and the switching network, and the use of complicated and dedicated signaling and switching procedures may be too expensive when compared to a method that would be limited to a single switching office and which would only use existing generic signaling and switching procedures.

Also, ISDN technology is now being deployed in the telephony field and ISDN is becoming the accepted method for evolving voice and data communications. ISDN uses a well-defined and standardized signaling protocol between a user terminal and the serving switching office to allow call set-up, connection, and termination procedures as well as offering supplementary services. The definition of the ISDN technology is included in the ANSI standards and CCITT recommendations.

One supplementary service offering built upon the principles of ISDN is the Electronic Key Telephone Service (EKTS); EKTS allow multiple telephone sets to simultaneously respond to an incoming call for a given telephone number, for instance, an appearance of a directory number (DN) on multiple terminals. EKTS also allows these telephone sets to make outgoing calls from the DNs, or to bridge onto an existing call for an active DN. An ISDN-based EKTS system uses enhancements to the basic ISDN technology to offer EKTS capability. In addition, the Call Appearance Call Handling (CACH) feature of EKTS allows multiple call appearances of the same DN on multiple terminals as well as on a single terminal.

Thus, a need exists in the art for mobile services which utilize existing features and functions offered by a single switching office having ISDN capability, including CACH-EKTS, thereby eliminating the need for special procedures and databases to handle such services.

SUMMARY OF THE INVENTION

These shortcomings and other limitations and deficiencies of the prior art are obviated, in accordance with the present invention, by a call processing methodology and concomitant system based on ISDN/CACH-EKTS technology which can broadcast incoming calls to mobile users of wireless handsets via a base station. Groups of mobile users are assigned a unique EKTS Directory Number (DN).

Broadly, with respect to an illustrative embodiment of the aspect of the present invention related to the methodology for processing an outgoing call from a cellular mobile calling user, each cellular mobile user has access to a cellular network which covers a number of cells served by a corresponding number of base stations. All of the base stations are connected to the same central office in an Integrated Services Digital Network; in addition, the central office is configured to provide Electronic Key Telephone Service, including the Call Appearance Call Handling (CACH) feature, to the base stations. The CACH feature associates a plurality of call appearance identifiers with each EKTS directory number (DN). To establish a communication connection between a cellular calling user and a called user, each base station is configured with a radio port to transceive radio signals with cellular users within the corresponding cell, and with an ISDN-based CACH-EKTS port to transceive CACH-EKTS signaling messages with the central office via an access interface having D- and B-channels. In addition, each of the mobile users is associated with one of the call appearance identifiers. When a cellular calling user requests a communication connection with a called user, the request is initially received by the radio port of the base station serving the cell where the cellular calling user is located. This base station converts the request to D-channel protocol signaling messages and then transceives the signaling messages with the central office to proceed with the call set-up; the protocol signaling messages include the corresponding one of the call appearance identifiers associated with the mobile calling user. Upon an answer response by the called user and further protocol signaling messages to complete the D-channel protocol processing, a B-channel is set-up between the called user and the base station serving the cellular mobile calling user. The incoming B-channel information (e.g., audible speech) to the base station is converted to radio signals for propagation to the cellular calling user, and radio signals propagated by the cellular calling user are converted to a format for transmission over the B-channel to the called user, thereby completing the desired communication connection.

Broadly, with respect to an illustrative embodiment of the aspect of the present invention related to the methodology for processing an incoming call to a cellular mobile user, each cellular mobile user has access to a cellular network which covers a number of cells served by a corresponding number of base stations. All of the base stations are connected to the same central office in an Integrated Services Digital Network; in addition, the central office is configured to provide Electronic Key Telephone Service, having the Call Appearance Call Handling (CACH) feature, to the base stations. The CACH feature associates a plurality of call appearance identifiers with each EKTS directory number (DN). To establish a communication connection between an incoming calling user and a cellular mobile user, each base station is configured with a radio port to transceive radio signals with cellular users within the corresponding cell, and with an ISDN-based CACH-EKTS port to transceive CACH-EKTS signaling messages with the central office via an access interface having D- and B-channels. When the incoming calling user requests a communication connection with a cellular mobile called user, the request is initially received at the central office from the incoming calling user. In turn, the central office transceives D-channel call set-up protocol signaling messages between the central office and the ISDN-based CACH-EKTS port of each of the base stations that share the CACH-EKTS call appearance. The protocol signaling messages include the corresponding one of the call appearance identifiers associated with the mobile user The base stations convert these signaling messages to a radio set-up signal corresponding to the request and propagate the radio set-up signal from the radio port of each of the base stations. The radio set-up signal is detected by each of the cellular mobile users and the identity of the cellular mobile called user is determined from the identifier in the radio set-up signal. The identified cellular mobile called user returns a corresponding radio set-up signal to its associated base station. With the location of the cellular mobile called user now known, a B-channel is established between the associated base station and the incoming calling user. The incoming B-channel information (e.g., audible speech) received at the associated base station is converted to outgoing radio information signals for transmission to the cellular mobile called user, and the incoming radio information signals from the cellular mobile called user are converted to information compatible with transmission over the B-channel to the incoming calling user, thereby completing the desired communication connection.

Broadly, with respect to an illustrative embodiment of the aspect of the present invention related to the stable call handoff methodology, each cellular mobile user has access to a cellular network which covers a number of cells served by a corresponding number of base stations. All of the base stations are connected to the same central office in an Integrated Services Digital Network; in addition, the central office is configured to provide Electronic Key Telephone Service, having the Call Appearance Call Handling (CACH) feature, to the base stations. The CACH feature associates a plurality of call appearance identifiers with each EKTS directory number (DN). To handle a handoff of an existing communication connection between a cellular mobile user and another user, each base station is configured with a radio port to transceive radio signals with cellular users within the corresponding cell, and with an ISDN-based CACH-EKTS port to transceive CACH-EKTS signaling messages with the central office via an access interface having D- and B-channels. In addition, each of the mobile users is associated with one of the call appearance identifiers. When the cellular mobile user moves from an original cell served by an original base station to a secondary cell served by a secondary base station, such movement being detected by tracking the unique identifier in the radio signals propagated by the cellular mobile user at the secondary base station or by an explicit request from the cellular mobile user to the secondary base station, the secondary base station requests to bridge onto the existing communication connection by transceiving D-channel protocol messages with the central office. The protocol signaling messages include the corresponding one of the call appearance identifiers associated with the mobile user. The outcome of this interchange is a three-way B-channel communication connection involving both the original and secondary base stations. The original base station is notified of this bridging activity by other D-channel protocol signaling messages and disconnects from the three-way connection, thereby producing a two-way B-channel communication connection between the secondary base station and the other user. The incoming B-channel information (e.g., audible speech) received at the secondary base station is converted to outgoing radio information signals for transmission to the cellular mobile user, and the incoming radio information signals received from the cellular mobile user are converted to information compatible for transmission over the B-channel to the other user, thereby completing the handoff of the existing, stable communication connection between the cellular mobile user and the other user.

BRIEF DESCRIPTION OF THE DRAWINGS

The teachings of the present invention can be readily understood by considering the following detailed description in conjunction with the accompanying drawings, in which.

DETAILED DESCRIPTION

After considering the following description, those skilled in the art will clearly realize that the teachings of our invention can be readily utilized to provide mobile services in conjunction with an CACH-EKTS service offering in an ISDN environment.

To facilitate understanding the broadest aspects of the present invention, and especially the principles underlying the present invention, it is helpful to first elucidate relevant details of ISDN. This approach has the added advantage of introducing terminology and notation which will further aid in understanding the present invention. Moreover, this approach ensures that the detailed description is essentially self-contained, thereby further facilitating the requirement of teaching one with ordinary skill in the art to make and use this invention. Accordingly, the initial part of the detailed description provides an overview of ISDN, including the Electronic Key Telephone System (EKTS) features utilized in an illustrative embodiment of the present invention. The ISDN topics selected for exposition are carefully chosen to set forth the context and backdrop for the present invention. After this overview, the illustrative embodiment is presented.

ISDN OVERVIEW (This overview begins with a motivating discussion of ISDN; the discussion gradually becomes more detailed as the description unfolds so as to introduce concepts and principles in the most understandable manner. A suitable reference which elaborates on additional aspects of ISDN is the text book entitled "ISDN", authored by William Stallings and published by Macmillan Publishing Company, 1989.)

Figure 1:
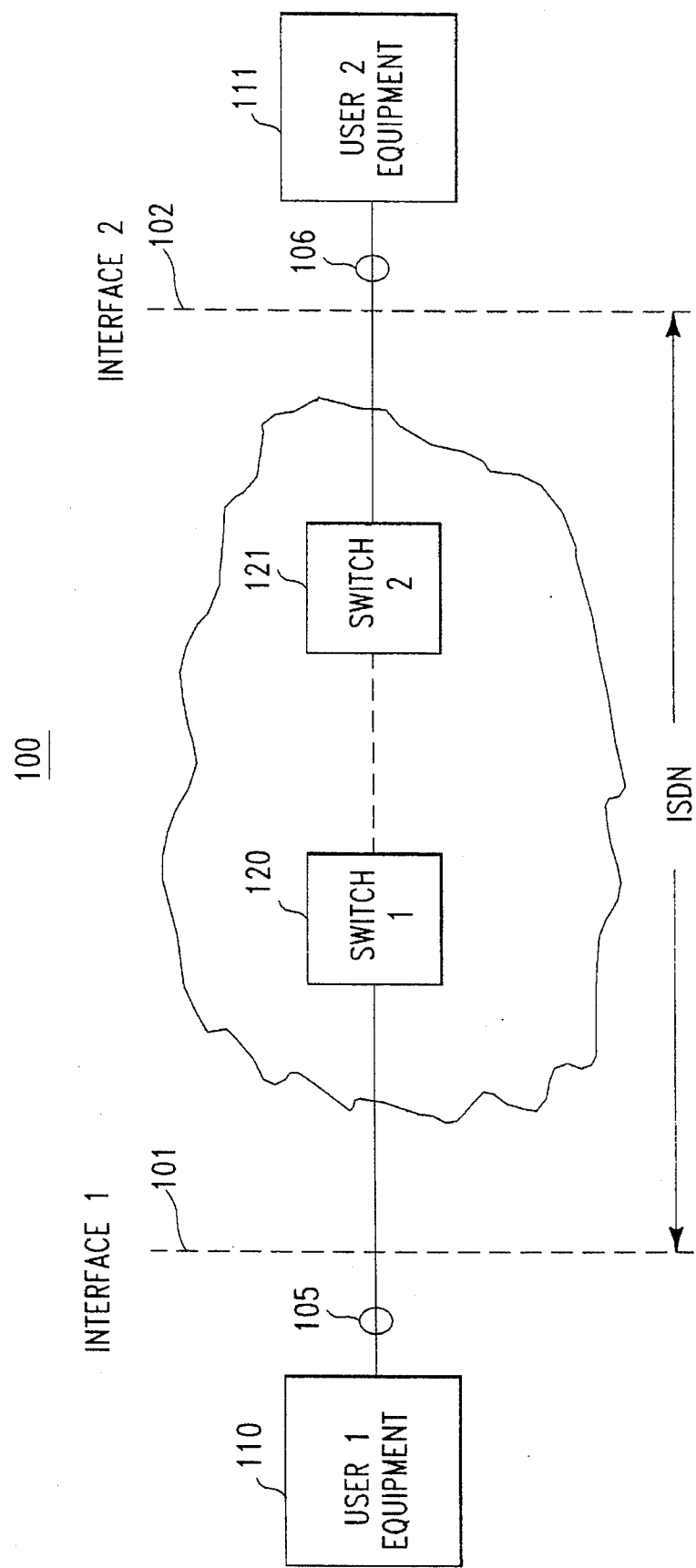
FIG. 1 is a conceptual model of ISDN depicting user equipment and user-network interfaces.

Broadly, with reference to the conceptual model of FIG. 1, ISDN may be viewed as a network 100 that provides end-to-end digital connectivity to support a wide range of user services, such as voice, data and video, to which such users have access utilizing standard, multi-purpose user-network interfaces (e.g. interface 101). Thus, information derived from or destined for customer-provided equipment located at a user's premises (e.g. equipment 110), including such equipment as a telephone, personal computer, stereo, and/or television, is seen at its basic level as data bit streams propagated over a medium (e.g. medium 105) between the user's equipment (e.g. 110) and a centralized switch (e.g. switch 120) embedded in the network. The equipment originating the information is transparent to the switch in the sense that all information has the same manifestation so it can be switched and transported in the same manner (e.g., from switch 120 to switch 121 and eventually over medium 106 to equipment 111 via interface 102.)

As alluded to above, ISDN has a common set of rules so that different types of user equipment can request one or more standard services provided by the network. This is in contrast to conventional telecommunications wherein different types of equipment require different physical and logical interfaces to the network. For instance, a conventional telephone set utilizing the public telephone network typically communicates over a wire-pair connected to a central office; the telephone, as manipulated by the user, interacts with central office via a pre-determined protocol (e.g., DC current flow, dual tone multi-frequency signals, 20 Hz ringing signal) so as to access other users served by the telephone network. A cable TV service requires the deployment of another physical medium (e.g., a coaxial cable) and end-point conversion devices to effect the necessary TV transmission. Generally, each new service requires a separate communications path and a different protocol. ISDN obviates the need for a myriad of paths and protocols since ISDN is fully integrated, that is, a single network provides many kinds of services using a single set of interface rules to govern all equipment using the network.

CALL PROCESSING

ISDN standards define the interface (e.g., interface 101 or 102 in FIG. 1) between the user and the network; the interface is expressed as a set of protocols, including a message set used to request services. To explore the full import of the notion of an interface, an example of an ISDN call set-up is now described.

Figure 2:
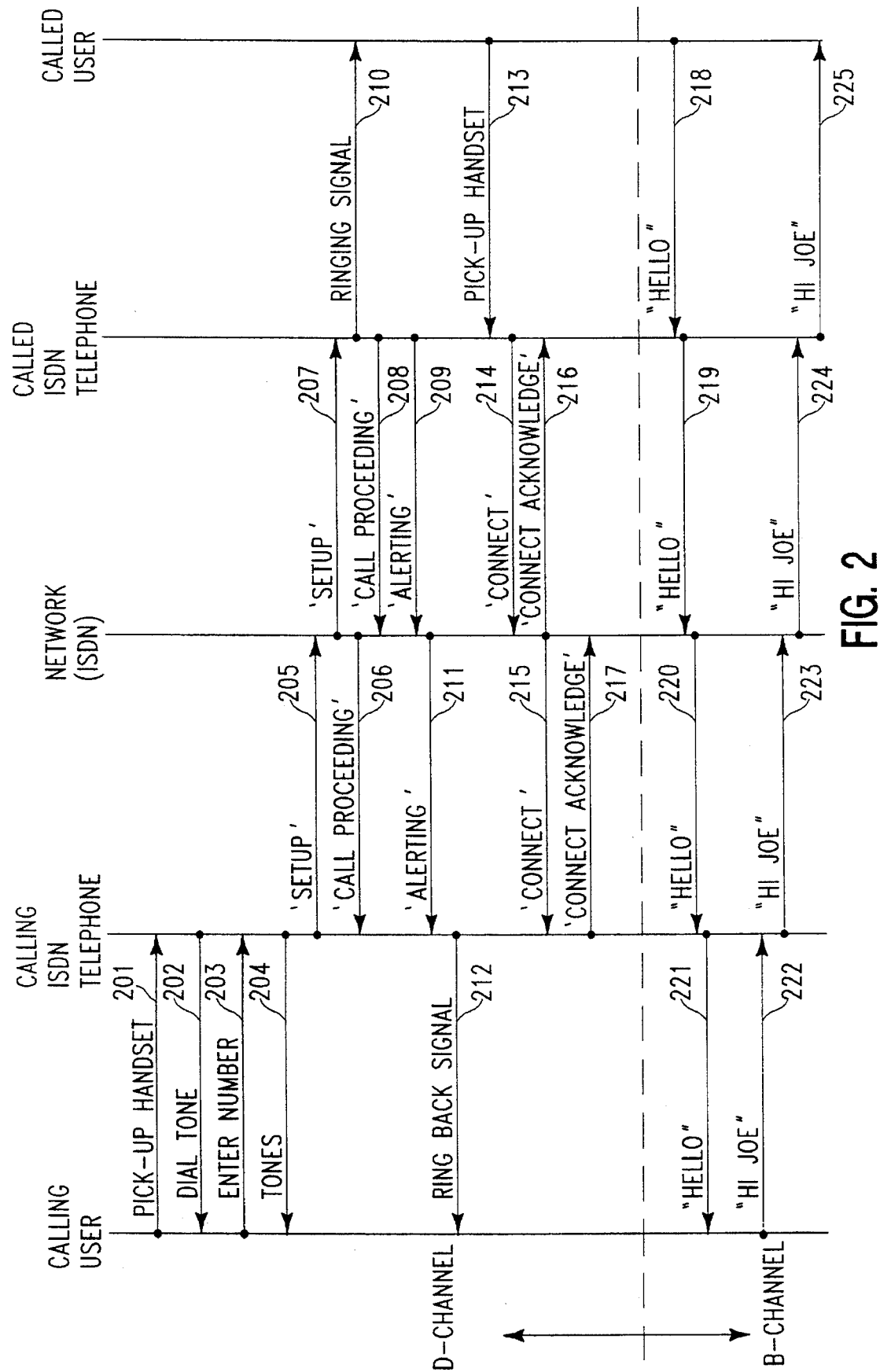
FIG. 2 is a pictorial representation of the user-network protocol to set-up a call between a calling user and a called user for a standard ISDN telephone call.

With reference to FIG. 2 there is shown a pictorial representation of the protocol for a call set-up between a calling user and a called user; the protocol is composed of a time-ordered flow of ISDN signaling messages. The calling user initiates a call by picking-up the handset (arrow 201). The calling ISDN telephone itself responds by providing dial tone (arrow 202); there is no ISDN network involvement as yet. (As used in describing FIG. 2, the term "network" is a shorthand for the ISDN combination of the switches and interfaces of FIG. 1.) The calling user enters the telephone number (arrow 203) and hears the tones as the keys are pushed on the telephone keypad (arrow 204). It is only after these four events have occurred that a signaling message is conveyed by the calling ISDN telephone to its switch within the network. This is accomplished by the calling ISDN telephone issuing a 'SETUP' service request (arrow 205). The 'SETUP' message is one standard message from a set of messages defined for ISDN. Each message is composed of a series of information elements encoded with signaling information necessary to support the service desired at the moment, as discussed in more detail later. Thus, each type of message has a very specific purpose and its name usually connotes that purpose. For example, besides the 'SETUP' message, other messages to be exemplified in the call set-up of FIG. 2 include 'CONNECT' and 'ALERTING'. Formally, the 'SETUP' message is defined as the message sent by the calling user to the network and by the network to the called user to initiate a call connection.

Continuing with the call set-up description of FIG. 2, upon receipt of the 'SETUP' message, the network checks to be sure that the contents of the message are valid. Presuming the contents are valid, the network returns a 'CALL PROCEEDING' (arrow 206) message to the calling user to indicate that the call request is valid and that call set-up is in progress. At the called side of the desired connection, the network also sends a 'SETUP' message (arrow 207) to the called user; this 'SETUP' message contains different informational elements than the 'SETUP' message conveyed by the calling ISDN telephone since this 'SETUP' message is serving a different local interface, but the message is compiled in basically the same manner. In the situation illustrated in FIG. 2, the called ISDN telephone's first message is a 'CALL PROCEEDING' message returned to the network (arrow 208). Also, a ringing signal (arrow 210) is sounded by the called ISDN telephone to alert the called user. A follow-up 'ALERTING' message (arrow 209) is also sent from the called ISDN telephone to the network to inform the network that the called ISDN telephone has received the 'SETUP' message and is alerting (ringing) the called user. The network informs the calling ISDN telephone of both the 'CALL PROCEEDING' message (arrow 206) and the 'ALERTING' message (arrow 211). As a result of this 'ALERTING' message, an audible ringback signal (arrow 212) is conveyed to the calling user by the called ISDN telephone. Assuming the called user picks-up the handset to answer the call (arrow 213), the response is a 'CONNECT' message (arrow 214) sent to the network from the called ISDN telephone. When the network receives this message, it sends another 'CONNECT' message to the calling ISDN telephone so a path may be completed over a separate, logical channel to handle the actual human voice communication. Appropriate 'CONNECT ACKNOWLEDGE' messages (arrows 216 and 217) are sent from the network to the called ISDN telephone and from the calling ISDN telephone to the network, respectively, to complete the call set-up sequence.

Once the aforementioned separate, logical channel is established, then the human voice conversation may proceed. This activity is shown by the "Hello" communication from the called user to the calling user (arrows 218–221) and the "Hi Joe" communication from the calling user to the called user (arrows 222–225).

Figure 3:
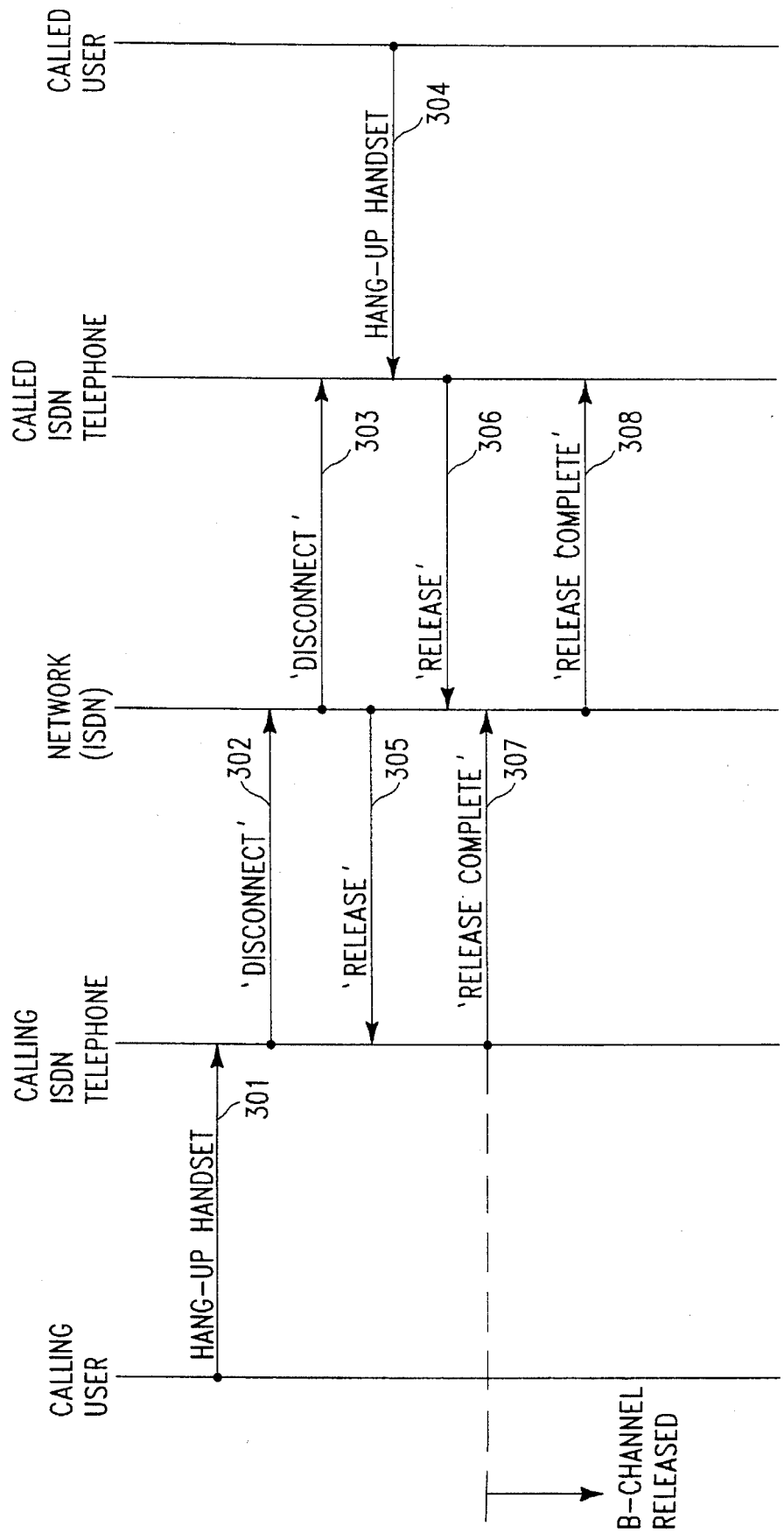
FIG. 3 is a pictorial representation of the user-network protocol to take-down a call between a calling user and a called user for a standard ISDN telephone call.

Now with reference to FIG. 3, there is shown a pictorial representation of the protocol, that is, the signaling messages, traversing the ISDN in order to take-down an established call set-up by the protocol of FIG. 2. It is assumed for discussion purposes that the calling user initiates the take-down procedure by hanging up their handset (arrow 301). This activity causes a 'DISCONNECT' message sent by the calling ISDN telephone (arrow 302) to the network; at the same time, the calling ISDN telephone disconnects itself from the established B-channel. The network initiates a 'DISCONNECT' message (arrow 303) to the called user, and returns the 'RELEASE' message (arrow 305) to the calling user. The calling ISDN telephone sends a 'RELEASE COMPLETE' message (arrow 307) to the network and the network releases the B-channel at this interface. The called party will also at some point hang-up their handset (arrow 304), which causes a 'RELEASE' message (arrow 306) to be sent from the called ISDN telephone to the network. The network releases the B-channel at this interface and sends a 'RELEASE COMPLETE' message (arrow 308) to the called ISDN telephone, which also releases the B-channel.

USER-NETWORK INTERFACE

As indicated in the preceding section, ISDN provides at least two basic types of channels that are differentiated by their function and transmission rate; these channels are referred to above as the D-channel and the B-channel. The D-channel's main purpose is that of carrying user-network signaling messages. All ISDN equipment exchange similar messages with the network to request services. The contents of the signaling messages vary with the equipment—an ISDN telephone would request different services than an ISDN television. In each case, however, the D-channel conveys the services requests. The D-channel typically operates at 16 kbps for a basic rate service offering.

Signals exchanged on the D-channel describe the type of service that the user is requesting. For instance, an ISDN telephone may desire a connection operating at 64 kbps for the support of a human voice conversation. This user request is translated to a request for a communication channel, and such a service is granted by allocating a so-called bearer channel (hence B-channel). Recall that during the discussion of FIG. 2, it was pointed out that the 'CONNECT' message caused a distinct logical path to be set-up for communicating the human voice conversation; specifically, this distinct logical path is a B-channel. The partitioning between the D and B channels is shown on the left-hand side of FIG. 2, wherein all set-up messages utilize the D-channel, but the actual communication makes use of the B-channel. Thus the primary function of the B-channel is to carry voice, data, and video. No service requests from the user are conveyed by the B-channel; this is strictly the domain of the D-channel. A B-channel has a bandwidth capability up to 64 kbps.

ISDN currently defines different access interfaces (e.g. interface 101 of FIG. 1) to the network; one of these is referred to as the basic rate interface (BRI). The access interfaces specify the rate at which the underlying physical medium will operate and the number of available B-channels and D-channels. The BRI is composed of one D-channel and two B-channels. The user data rate on the BRI is 144 kbps (2 at 64 kbps+16 kbps), although additional signaling for the physical connection requires that the BRI operated at a total bit rate of 192 kbps.

To gain a full appreciation of the ISDN user-network interface for later exploitation by the present invention, it is instructive to provide a broad description of the protocols that are used across the interface and their utilization by the D- and B-channels. The ISDN protocols for the D-channel are encompassed by three layers, as outlined below:

Layer 1: Describes the physical connection between terminal equipment and a network termination, including line coding scheme and electrical characteristics.

Layer 2: Describes the procedures to ensure error-free communication over layer 1 and defines the logical connection between the user and the network.

Layer 3: Describes the user-network interface and signaling messages used to request services from the network.

Figure 4:
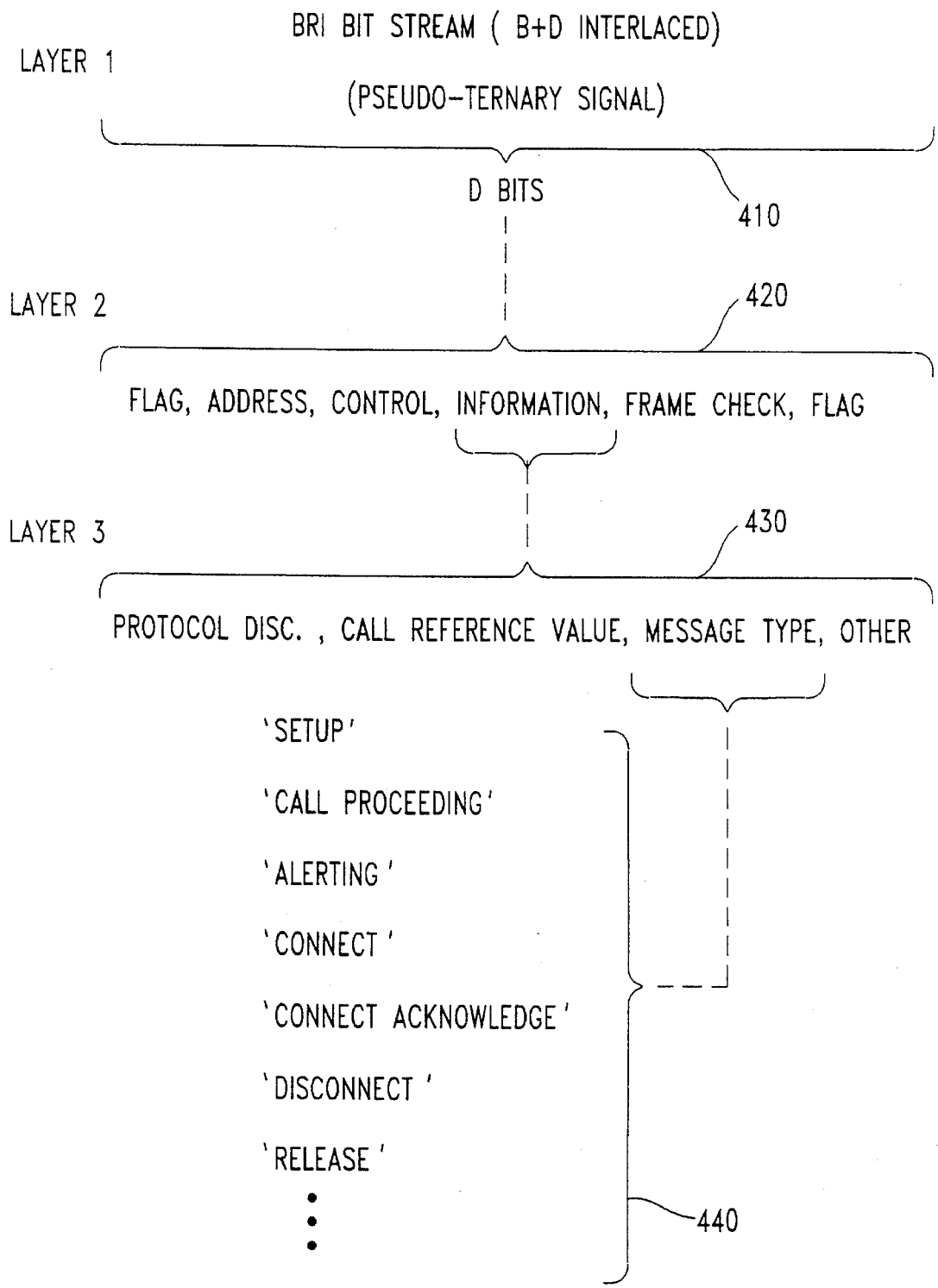
FIG. 4 illustrates the relationship among the three ISDN layers with especial reference to the signaling messages supported by ISDN.

The interaction among the three protocol layers is such that layer 3 signaling messages are carried as a subpart of layer 2 frames, which in turn are transmitted across the layer 1 physical link. In order to succinctly describe this interaction, reference is made to FIG. 4 which depicts the interpretation of the data bit stream propagated by layer 1 over a BRI. The bit stream encompassed by time line 410 uses pseudo-ternary signaling and is formed by interleaving B-channel and D-channel bits. Focusing on only the D-channel bits of this overall BRI bit stream, as depicted by the time line 420, it is shown that certain higher-level information is conveyed at layer 2. For instance, the initial eight bits compose a Flag field, whereas a certain number of the next-arriving bits comprise an Address field, then comes a stream of bits representing the Control field, then the Information field, and finally the Frame Check and another Flag field. From the point of view of the present invention, the Information field is a focal point. As is depicted by time line 430, the Information field can be further subdivided into a number of other fields for interpretation at layer 3. Of the fields at the layer 3 level, the one that conveys the signaling messages is denoted as Message Type along time line 430. Various signaling messages which can be conveyed by this field are depicted by inclusion bracket 440. Such messages as 'SETUP', 'CALL PROCEEDING', . . . , and 'RELEASE', which have already been discussed, are listed

DIGITAL SWITCHING SYSTEM WITH ISDN CAPABILITY

Figure 5:
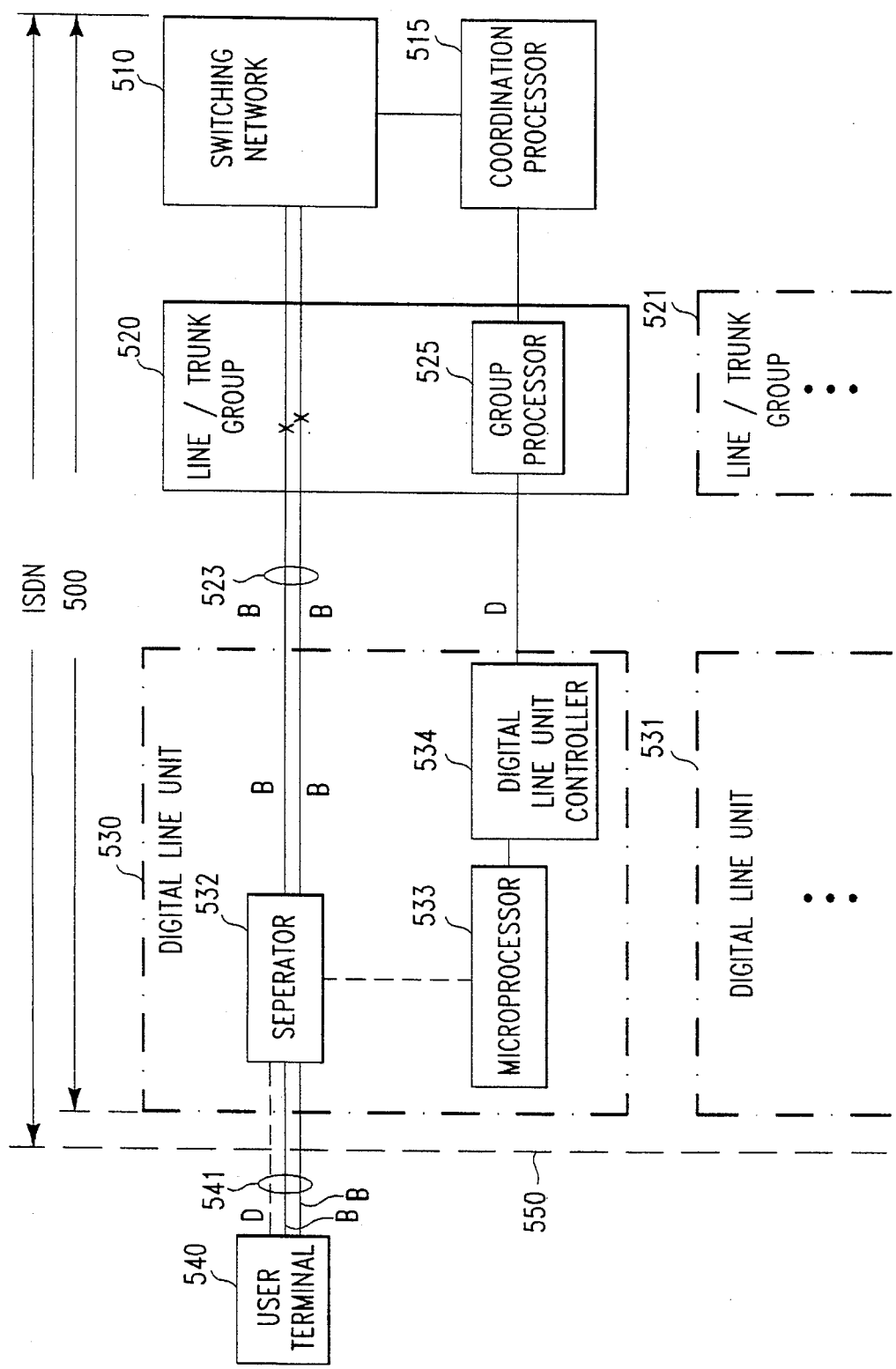
FIG. 5 illustrates an example of a digital switching system configured to support ISDN service.

Many commercially available digital switching systems provide ISDN capability as part of their basic architecture. One such commercially available system is the EWSD switching system available from the Siemens AG. For purposes of the present invention, only a high-level description is required to set forth a context for an illustrative embodiment of the present invention which will be discussed below. Such a high-level block diagram of the EWSD architecture arranged with ISDN is shown in FIG. 5. System 500 is composed of a limited number of loosely coupled subsystems which are each largely self-sufficient. Switching network 510 is the primary interconnection point to all the subsystems. Switching network 510 is composed of both time and space stages and it is virtually non-blocking. Coordination processor 515 is responsible for total system integrity as well as a part of call processing. Processor 515 does only those parts of the call processing functions which are naturally performed best by a centralized controller. These functions include switching network 510 path set up, final translation and routing and general call control coordination. All other call processing functions like signaling, digit collection and feature handling are done in line/trunk group 520. Line/truck group 520 is the subsystem which terminates numerous digital line carriers on both its incoming (523) and outgoing (522) ports. Group processor 525 in line/trunk group 520 manages all the control functions of this subsystem. Digital line unit 530 performs a concentration function and terminates a number of incoming BRIs exemplified by BRI 541. Digital line unit controller 534 provides for communication between digital line unit 530 and line/trunk group 520. Separator 532 of unit 530 handles the three layers of the D-channel and effects separation of the D- and B-channels. Microprocessor 533 handles D-channel protocol signaling and packages the protocol information into an internal format which, in turn, is made available to group processor 525 to control line/truck group 520 and is also made available to switching network 510 for switching activity. Line/trunk group 520 and digital line unit 530 may be replicated as needed (e.g. group 521 and line unit 531) to satisfy system capacity requirements. ISDN for this illustrative arrangement encompasses both system 500 as well as exemplary ISDN interface 550.

EKTS PROPERTIES AND FEATURES IN AN ISDN ENVIRONMENT

Figure 6:
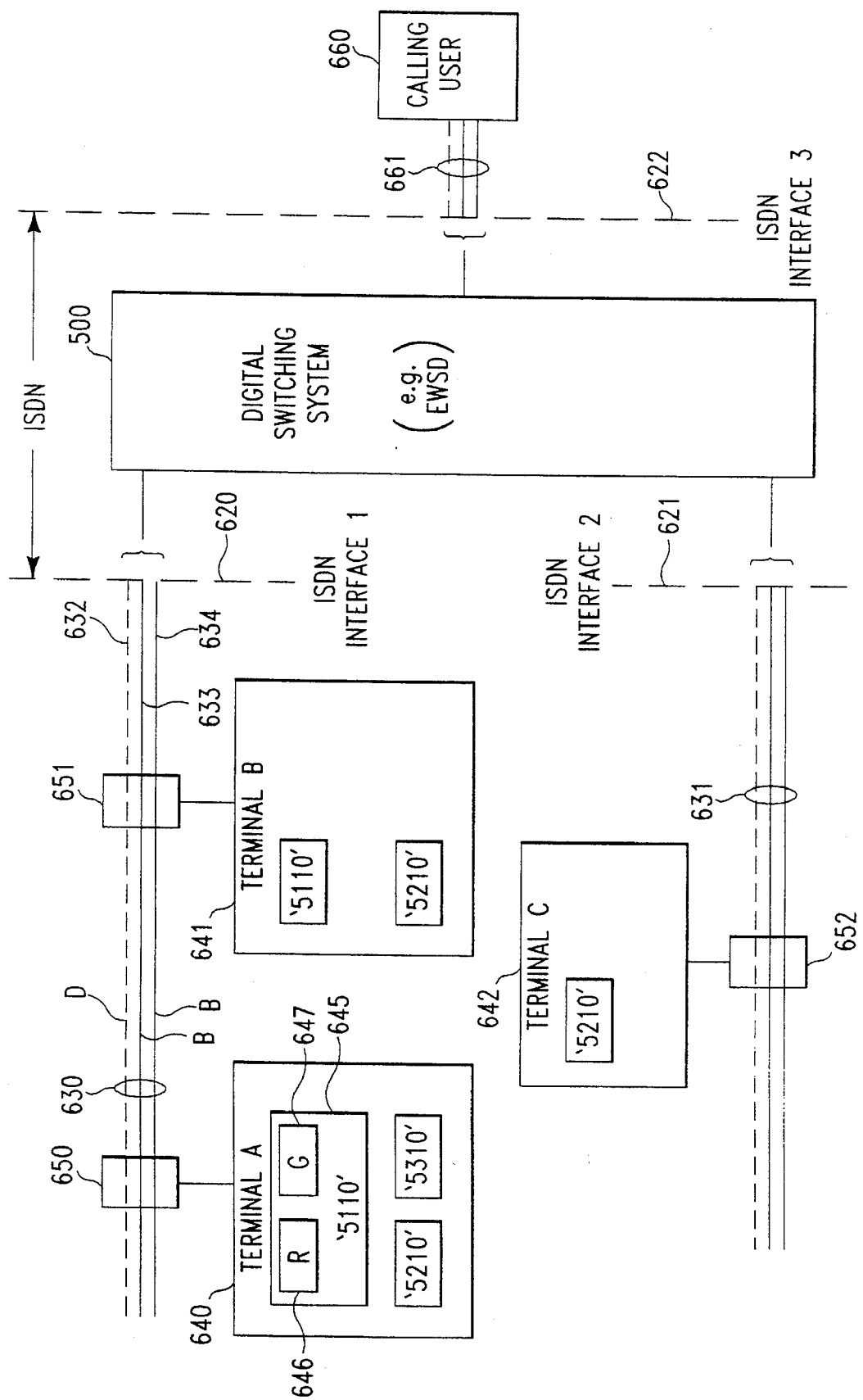
FIG. 6 depicts an illustrative arrangement of a plurality of EKTS terminals served by a single ISDN switch.

Electronic Key Telephone Service (EKTS) allows a user served by an ISDN interface to have access to multiple directory numbers, referred to as DNs. Moreover, a given DN can also be accessed by more than one user, i.e., from more than one user equipment, on the same ISDN interface and/or different interfaces. In addition, two or more users with access to the same DN can be simultaneously bridged onto the same call established for that DN. These features are illustrated in FIG. 6, which is essentially the architecture of FIG. 5 recast for particular discussion of the EKTS features. FIG. 6 depicts system 600 having digital switching system 500 (see FIG. 5) serving three ISDN interfaces 620–622. Interface 620 provides basic rate interface (BRI) 630 to user terminals 640 and 641, whereas interface 621 provides BRI 631 to user terminal 642 and interface 622 provides BRI 661 to calling user 660. Terminal 640 is coupled to BRI 630 via connector 650 (e.g. NT1/NT2), and terminal 641 is coupled to BRI 630 via connector 651 (e.g. NT1/NT2). Terminal 642 has connector 652 (e.g. NT1/NT2) as the coupling mechanism to BRI 631. (Each BRI 630 or 631 is depicted as being composed of a (dashed line) D-channel (e.g. 632) and two (solid line) B-channels (e.g., 633 and 634)). Terminal 640 is depicted for illustrative purposes as having three DN appearances, namely, '5110', '5210' and '5310', whereas terminal 641 has two DN appearances '5110' and '5210', with terminal 642 having only DN '5210' as an appearance. Such DNs usually have a push-button key appearance on the face of the terminal, as exemplified by key 645 on terminal 640; oftentimes, colored lights may be displayed through translucent panels formed integral to the key so as to provide alerting functions to the user—such panels are shown as 'red' (R) display panel 646 and 'green' (G) display panel 647 formed as part of key 645.

As alluded to above, users of all terminals have access to directory number '5210', users of terminals 640 and 641 have access to DN '5110', and only terminal 640 has the appearance of DN '5310' (one or more other terminals, not shown, presumably have appearances of '5310' so '5310' is a true DN, that is, has multiple appearances). In one of the operational modes provided by system 600, a user of terminal 640, 641, or 642 (say terminal 640) may initiate an outgoing call to a called user outside of EKTS by pushing the appropriate DN key, say DN '5210'. The calling EKTS telephone provides status information to the calling user, such as steady red and green key panel lights on key 645 when the call is established. The other two terminals (641 and 642) are alerted to the ongoing activity by an appropriate alerting signal, such as a steady red key panel light on its DN '5210' appearance. Such an indication will remain in effect during the remainder of the call connection for the non-participating terminals 641 and 642.

In another operational mode provided by system 600, if calling user 660 initiates a call to DN '5210' through digital switching system 500, then each user of terminals 640–642 receives an alerting signal (such as both a ringing signal and a blinking red panel light on key '5210') to indicate that there is an incoming call on each appearance of DN '5210'. Typically, once access is granted to one of the users, that is, one of the users answers the incoming call at one terminal (e.g. terminal 640), the remaining two users (terminals 641 and 642) receive an indication that the DN is active (such as a steady red panel light), while the answering terminal 640 will have another status indicator (such as steady red and green panel lights). The signaling to establish the connection between calling user 660 and terminals 640–642 is conveyed by both D-channels 632 and 635; once a connection is established between calling user 660 and called user of terminal 640, the users communicate over a B-channel, such as channel 633. More details pertaining to the set-up of this call will be covered shortly.

During an established connection between a calling user and a called user such as just described, it is possible for another user having access to the active DN to bridge onto the call. For instance, the user of terminal 641 may bridge onto the call established between calling user 660 and terminal 640 merely by pushing the key associated with DN '5210'; prior to pushing the key, there is a steady red light indicator, and after the key is pushed, both steady red and green lights appear on the key panels of the bridging user's DN '5210'. It is possible at this time for the original called user of terminal 640 to disconnect from the established connection by again pushing the '5210' DN key, which turns off the green light but maintains the red light on the key panel as an indication of the remaining established connection.

The description of the EKTS features to this point has been purposely general in nature so that the essentials of the features could be presented before any further complexities are introduced. The complexities involve the ISDN signaling messages which are propagated over the D-channels of the various BRIs comprising an ISDN service offering to set-up, bridge, or take-down a call. (A suitable reference covering EKTS features in an ISDN environment is the Technical Reference TR-TSY-000205 entitled "ISDN Electronic Key Telephone Service", Issue 1, December 1988, published by Bellcore.)

As outlined above, a fundamental capability of EKTS is the ability to allow different users each to have a terminal appearance of a given DN. To support this capability, the EKTS terminal supports certain D-channel signaling messages not present in a more basic ISDN offering. For instance, with reference to FIG. 6, when calling user 660 directs a call to a DN (e.g., '5210'), the call is offered to each terminal 640–642 with a 'SETUP' message; this message is composed of the called party DN, bearer information to be used by the terminals for compatibility checking, and the type of alerting to be applied, as conveyed by the various layers depicted in FIG. 4. When the call is answered by a called user (e.g. terminal 640), all other terminals will receive a 'KEY HOLD' message. This 'KEY HOLD' message is interpreted by each of the other terminals as notification that the call has been answered by another user, that is, the call is no longer alerting.

Figure 7:
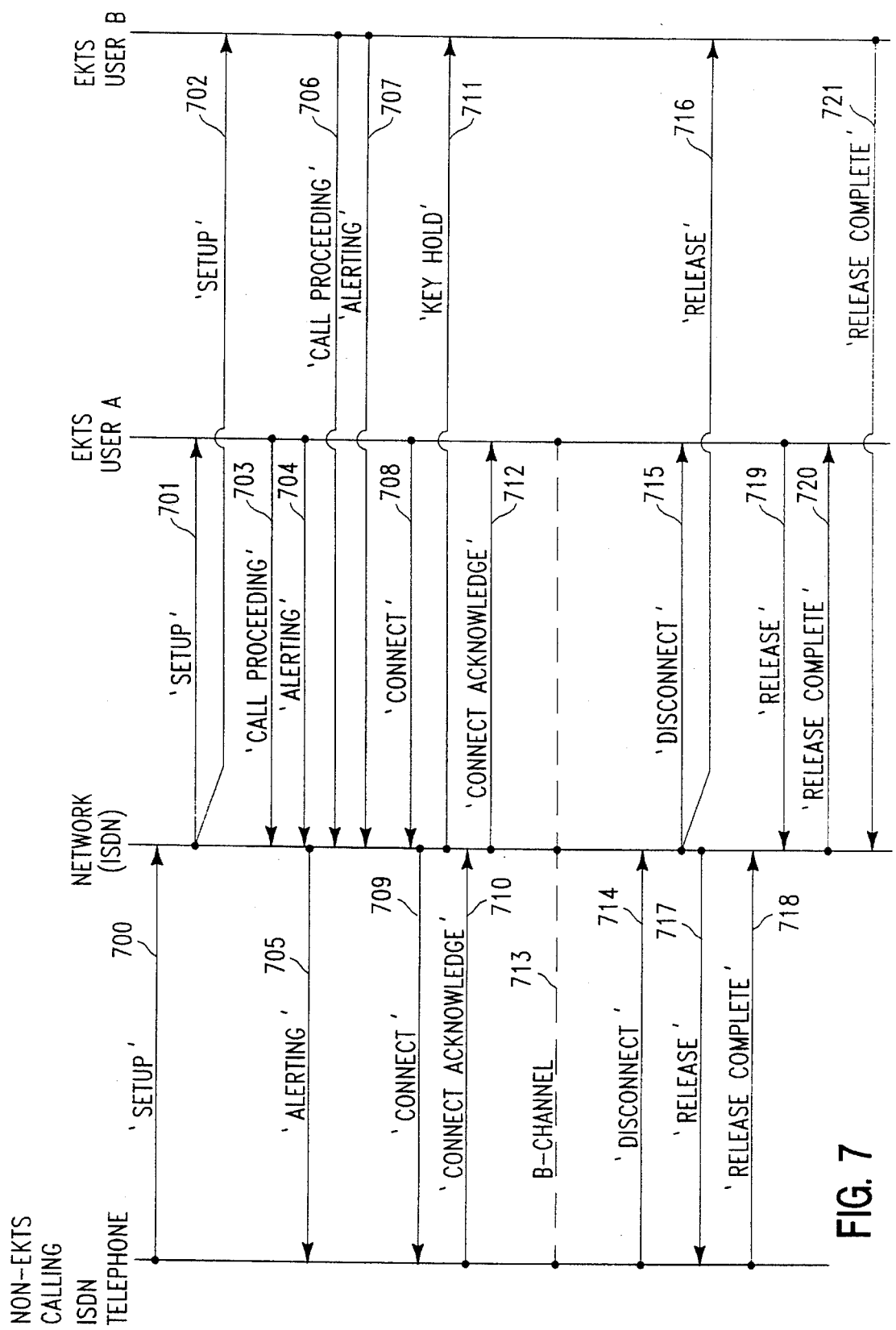
FIG. 7 is a pictorial representation of the ISDN user-network protocol to set-up a call between a calling user outside EKTS and a called user served by EKTS.

A more explicit depiction of the signaling messages transmitted by a system exemplified by FIG. 6 are shown in FIG. 7, which is a pictorial representation of the ISDN user-network protocol to set-up a call between a calling user outside EKTS and a called user served by EKTS. FIG. 7 is commensurate with FIG. 2 for comparison purposes to distinguish a non-EKTS service with an EKTS service in an ISDN environment. It should be noted however, for conciseness, that the actions (such as "pick up handset") of the calling user and called user, as explicitly shown in FIG. 2, have not been shown in FIG. 7; one skilled in the art may readily comprehend the actions now required of the users in FIG. 7 given the discussion of FIG. 2. With reference to FIG. 7, the non-EKTS calling ISDN telephone transmits a 'SETUP' message (arrow 700) to the network. In turn, the network sends 'SETUP' messages (arrows 701 and 702) to EKTS users A and B (say terminals 640 and 641 in FIG. 6; terminal 642 is ignored in this discussion for brevity). Both users A and B respond with the standard 'CALL PROCEEDING' and 'ALERTING' messages (arrows 703,706 and 704,707, respectively). In addition, 'ALERTING' message 705 is sent from the network to the calling ISDN telephone. It is supposed that user A answers the incoming EKTS call, so that a 'CONNECT' message (arrow 708) is transmitted from EKTS user A to the network. The network responds by sending a 'CONNECT' message (arrow 709) to the calling ISDN telephone. Moreover, the network sends a 'KEY HOLD' message (arrow 711) to EKTS user B to signal the fact that another user on EKTS has answered the call. Upon the 'CONNECT ACKNOWLEDGE' messages (arrows 710 and 712) provided by the calling ISDN telephone and the network, respectively, the B-channel (dashed line 713) between the calling ISDN telephone and EKTS user A is established.

Continuing with the description of FIG. 7 (which is now to be contrasted with FIG. 3), it is now supposed that the calling ISDN telephone terminates the call; this leads to a 'DISCONNECT' message (arrow 714) being transmitted to the network. The network responds by sending a 'DISCONNECT' message (arrow 715) to the active EKTS user A and a 'RELEASE' message (arrow 716) to the non-participating EKTS user B. In addition, a 'RELEASE' message (arrow 717) is sent from the network to the calling ISDN telephone. Both the calling ISDN telephone and EKTS user B respond by sending 'RELEASE COMPLETE' messages (arrows 718 and 721, respectively) to the network; on the other hand, the network sends a 'RELEASE' message (arrow 719) and awaits a 'RELEASE COMPLETE' message (arrow 720) to thereby complete the take-down of the established call.

Figure 8:
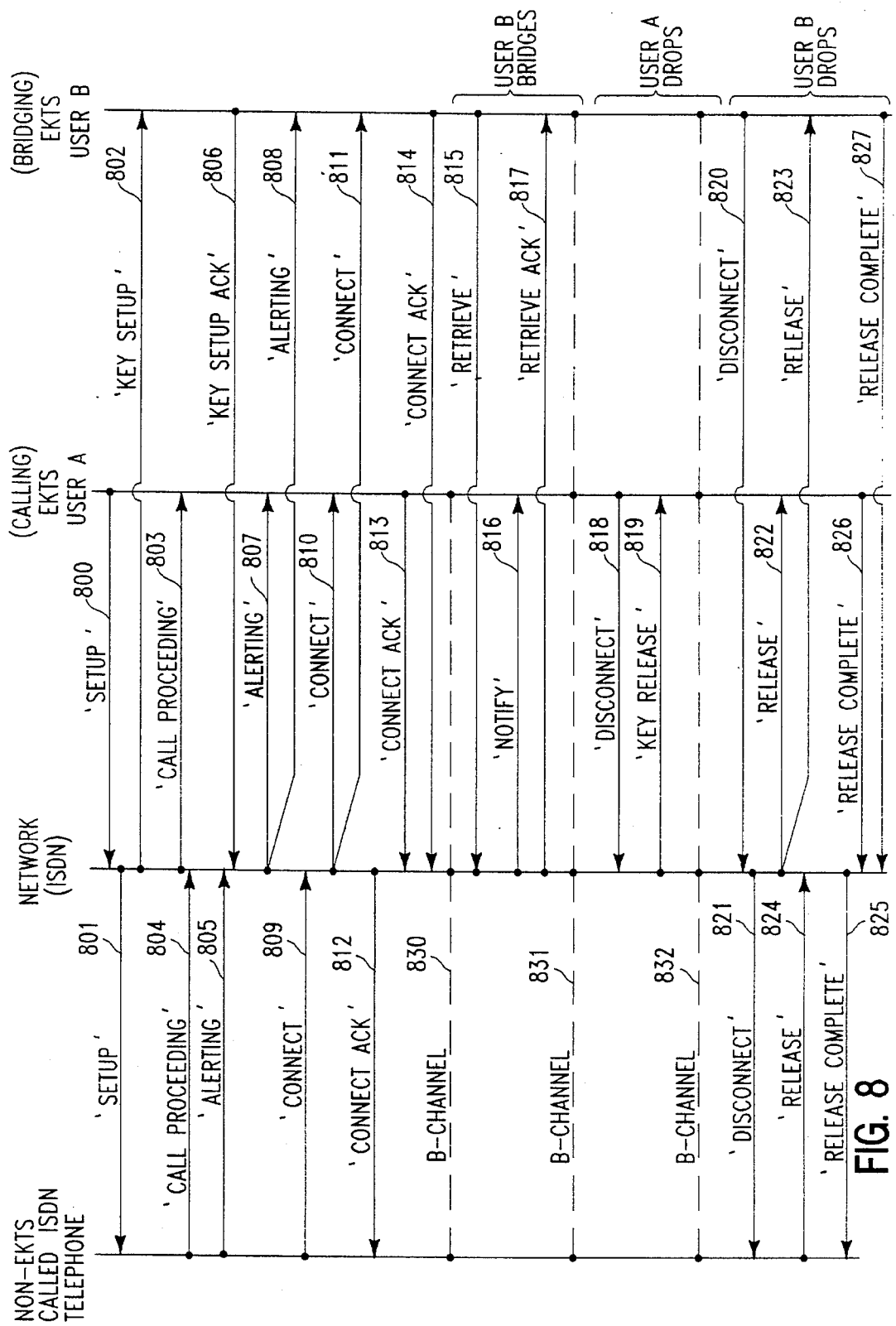
FIG. 8 is a pictorial representation of the ISDN user-network protocol to set-up a call to a called user outside EKTS from a calling user served EKTS, and then the bridging of another user served by EKTS onto the established call.

To further discern refinements to ISDN fostered by EKTS, reference is now made to FIG. 8, which is a pictorial representation of the ISDN user-network protocol setting-up a call to a called user outside EKTS from a calling user served by EKTS, then the bridging of another user served by EKTS onto the established call, and finally the dropping off of the original calling user from the established call. The process is initiated by the calling terminal of EKTS user A sending a 'SETUP' message (arrow 800) to the network. As expected, the network responds by sending a 'SETUP' message (arrow 801) to the called ISDN telephone; also, the network responds to the original 'SETUP' message by conveying a 'KEY SETUP' message (arrow 802) to EKTS user B. The network sends the 'CALL PROCEEDING' message (arrow 803) to calling EKTS user A. The called ISDN telephone responds with the usual 'CALL PROCEEDING' and 'ALERTING' messages (arrows 804 and 805). In the meantime, EKTS user B responds with a 'KEY SETUP ACKnowledge' message (arrow 806) to inform the network that the earlier 'KEY SETUP' message was received. 'ALERTING' messages (arrows 807 and 808) are sent from the network to both EKTS users A and B. When the called ISDN telephone answers, a 'CONNECT' message (arrow 809) is conveyed to the network; in turn, the network sends 'CONNECT' messages (arrows 810 and 811) to EKTS users A and B, respectively. 'CONNECT ACKnowledge' messages (arrows 812, 813, and 814) are appropriately transmitted from the network or to the network, as needed. With the set-up cycle complete, a B-channel (dashed line 830) is established between the called ISDN telephone and the calling EKTS user A.

With the call established, EKTS user B is aware of the established call via an appropriate indicator such as a panel key light, and EKTS user B may desire to bridge onto the established call. For example, EKTS user B may push the DN key of the established call; this results in a 'RETRIEVE' message (arrow 815) being sent to the network to indicate user B's desire to bridge onto the established call. The network responds by, first, sending a 'NOTIFY' message (arrow 816) to EKTS user A to indicate the fact that another EKTS party is entering the established connection, and secondly, the network sends a 'RETRIEVE ACKnowledge' message (arrow 817) to EKTS user B to inform this user that bridging will occur. As depicted (dashed line 831), a B-channel then is arranged to link both users A and B with the called ISDN telephone.

If EKTS user A now wishes to drop from the established call, a 'DISCONNECT' message (arrow 818) is transmitted to the network by EKTS user A. The network responds by sending a 'KEY RELEASE' message (arrow 819) to EKTS user A to inform this user that its B-channel connection will be dropped (as depicted now by dashed line 832 connecting only EKTS user B with the called ISDN telephone).

Finally, since only EKTS user B is on the established call from the perspective of EKTS, if user B disconnects, then the call is to be terminated. This is shown by the 'DISCONNECT' message (arrow 820) being transmitted from EKTS user B to the network. In turn, a 'DISCONNECT' message (arrow 814) is sent to the called ISDN telephone by the network; moreover, the network sends 'RELEASE' messages (arrows 822 and 823) to EKTS users A and B, respectively. The called ISDN telephone responds to its 'DISCONNECT' message with a 'RELEASE' message (arrow 824) to the network. To complete the termination procedure and take down of the B-channel, both EKTS users A and B respond to the network with 'RELEASE COMPLETE' messages (arrows 826 and 827, respectively).

CALL APPEARANCE CALL HANDLING EKTS PROPERTIES

One optional feature offered by the ISDN EKTS service is Call Appearance Call Handling (CACH) wherein an EKTS terminal supports multiple appearances of a DN. To elucidate the feature, reference is made to FIG. 9, which is basically FIG. 6 redrawn to show the added CACH feature. Terminal 642 now has both a first appearance of DN '5210' (represented by key 901) as well as a second appearance of the same DN (represented by key 902). With respect to terminology, it is said that the "first call appearance" is shared by terminals 640 and 641 on interface 620 and by terminal 642 on interface 621, whereas the "second call appearance" can be accessed only by terminal 642 on interface 621. A CACH-EKTS system can have access to, for example, up to 128 call appearances per DN. Thus, while a basic EKTS terminal (as described in the previous section) maps calls into call appearances using the DN, a CACH-EKTS terminal maps calls into call appearances using a "call appearance identifier"—a number coded in the BRI bit stream 410 of FIG. 4 which provides a one-to-one mapping with a call appearance on a CACH-EKTS terminal. Accordingly, each EKTS terminal has circuitry for maintaining the busy/idle status for a set of EKTS call appearances associated with each DN.

Figure 9:
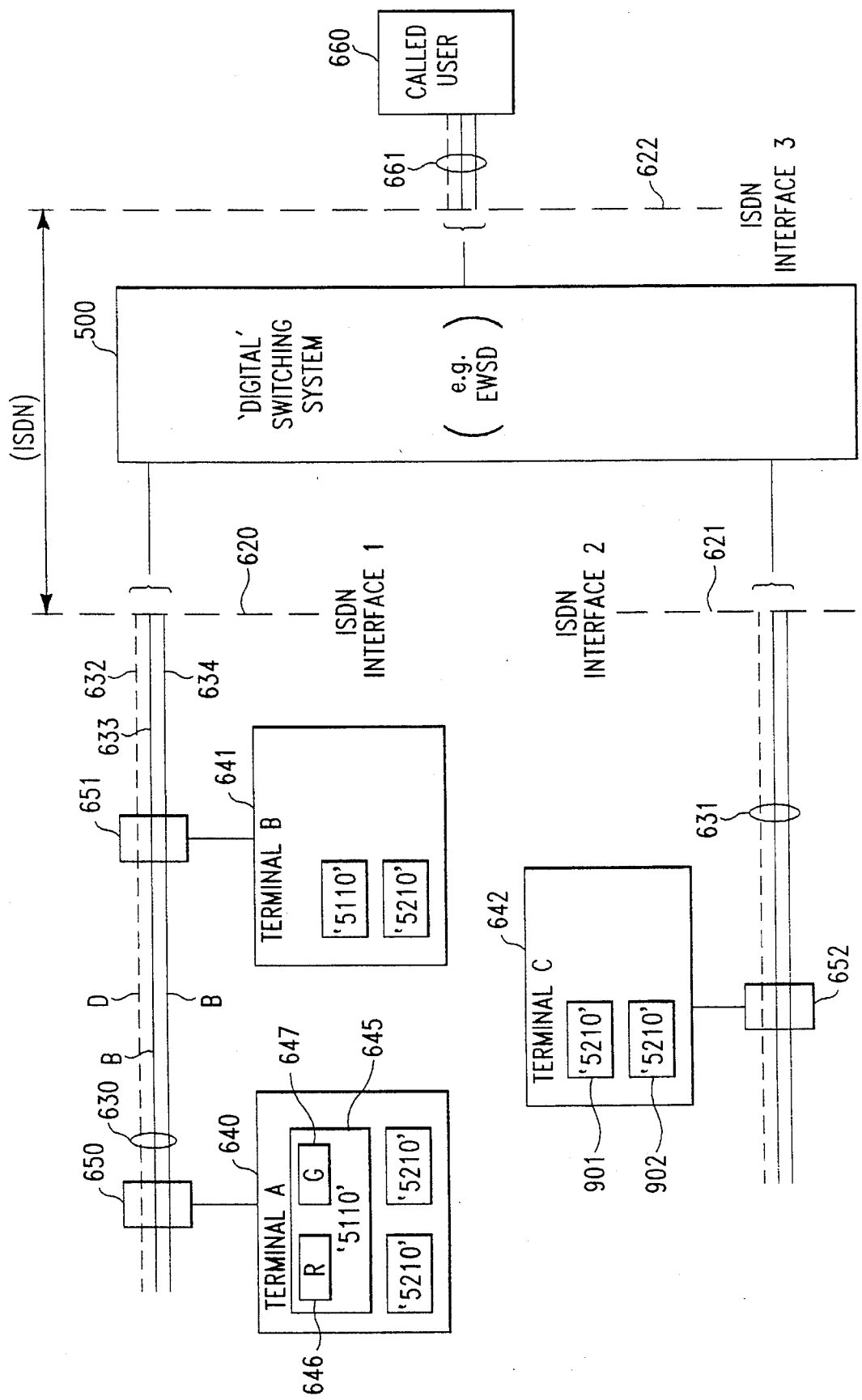
FIG. 9 illustrates an arrangement of a CACH-EKTS terminal have multiple call appearances for the same DN.

For example, in FIG. 9, if it is supposed that a first call to DN '5210' is maintained by terminal 642 (through key 901 in particular), and no other call is active at terminal 642, then terminal 642 operates to mark the first call appearance as busy, whereas the second call appearance is marked as idle. Given this status of the call appearances, a second call to DN '5210' may arrive at terminal 642 (via key 902 in particular), and the user may, for instance, place the first call on 'hold' to answer the second call; now both appearances are marked as busy. This scenario provides essentially the same call handling at terminal 642 which would take place if keys 901 and 902 where associated with different DNs. On the other hand, from the point of view of the two calling parties in the CACH situation, both calling parties placed calls to '5210', but in the second non-CACH situation, two different DNs are utilized. This difference highlights the advantage of CACH service, namely, outside callers only place calls to a single DN, but multiple calls can be received by the called party—the CACH service keeps track of the busy/idle status of the various call appearances and can route calls for the same DN accordingly. In a non-CACH situation, if the DN were busy, another caller to the DN may receive a 'busy' signal; in the CACH situation, the caller is routed to an idle call appearance wherein the call may be handled by the called party.

With the CACH-EKTS service, call control procedures previously described with respect to FIGS. 7 and 8 must be augmented in order to handle, for example, call origination and call termination. For instance, with a CACH-EKTS terminal, the selected call appearance must be matched with the appropriate call appearance identifier. The SETUP message for call origination then includes the call appearance identifier in the call appearance information element, instead of including the calling party number information element. A complete description of the modifications necessary to encompass the CACH-EKTS feature is set forth in Chapter 10 of the Special Report, SR-NWT-001953, Issue 1, June 1991 as published by Bellcore, as well as the previously identified Technical Report of Bellcore. The inventive subject matter in accordance with the present invention exploits the generic CACH-EKTS call handling capability, so such a generic capability is a presumed starting point for the present invention.

EMBODIMENT OF THE PRESENT INVENTION

The description in the foregoing overview of ISDN has elucidated the fundamental circuit arrangements, protocols, and operational principles which will facilitate the description of the present invention. Of special importance is the fact that the illustrative embodiment of the present invention takes advantage of these presently existing arrangements, protocols, and principles of ISDN and CACH-EKTS technology to engender a wireless service wherein a Directory Number (DN) is shared across a set of wireless handsets.

To convey the principles of the present invention, the use of a motivating example is most expeditious. The example relates the use of the circuitry and methodology of the present invention to communications required by a 'roaming' employee in a warehouse setting. In this setting, a warehouse employee utilizes a wireless handset while working away from their desk (e.g., stocking parts), and the employee may answer an incoming call or originate an outgoing call using the handset. The employee is linked to a radio-propagation type base station which now replaces the CACH-EKTS terminal heretofore discussed. To further extend the example, the employee may answer an incoming call and roam the warehouse looking for a requested part while remaining in constant contact with the calling party. Upon finding out information about the part, the employee may then directly convey the requested information to the calling party. Any other handset, either wireline or wireless, sharing the same DN could also bridge onto the call. Moreover, since it is possible that the employee, in search of the requested part, may roam outside the range of the base station upon which the incoming call originally appeared, the bridging feature in CACH allows the call to be handed-off to another base station to serve the handset with a stronger base station signal. In addition, in a CACH setting, during this call connection, another call to the same DN could be handled through a second appearance of the DN at the base station.

Figure 10:
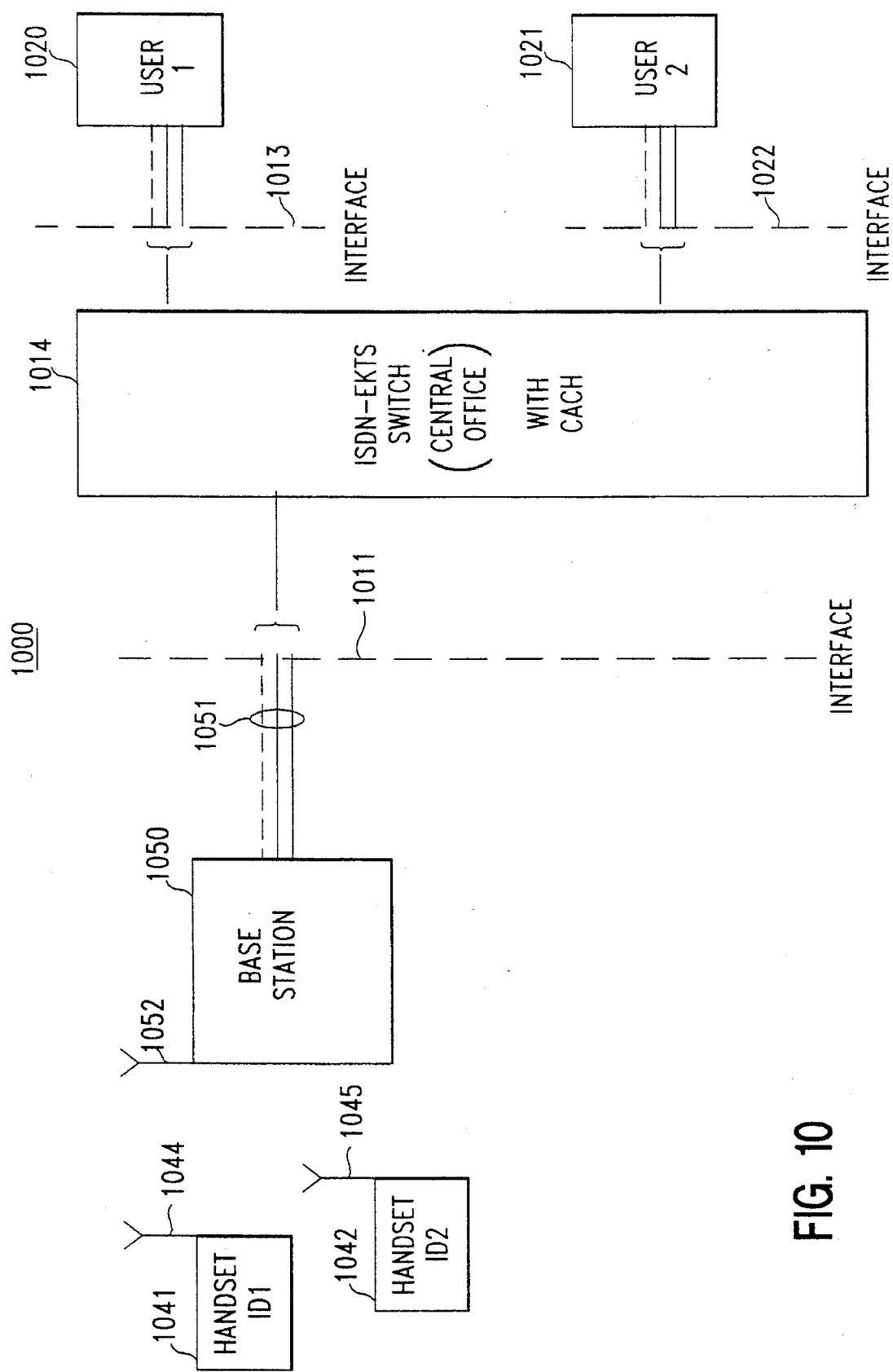
FIG. 10 illustrates an arrangement of a mobile radio-based base station serving to 'roving' users with wireless handsets.

Referring to FIG. 10, there is shown 'roamer' system 1000 which is composed of: an ISDN encompassing ISDN-EKTS switch 1014 providing the CACH feature (e.g. system 500 of FIG. 5) and ISDN interfaces 1011, 1013 and 1022; base station 1050 serving exemplary wireless handsets 1041 and 1042; and users 1020 and 1021 connected to interfaces 1013 and 1022, respectively. Switch 1014, when providing the CACH feature, internally maintains the busy/idle status of call appearances. Base station 1050 is connected to interface 1011 via BRI 1051. This base station represents an additional type of terminal equipment in the category of an ISDN telephone, TV, or CACH-EKTS terminal. In fact, as will become apparent shortly, the base station is configured so that the port connected to the basic rate interface is implemented to process the CACH-EKTS features elaborated upon earlier. In addition, another base station port functions in the conventional mobile sense as a transmitter/receiver ("transceiver") of wireless signals. Also, handsets 1041 and 1042 are assigned the same CACH-EKTS directory number (DN). Moreover, each handset is assigned a unique identifier (ID) so as to keep track of the activity status of the handsets. Finally, each handset operates, for example, in a unique frequency band in the radio spectrum.

Figure 11:
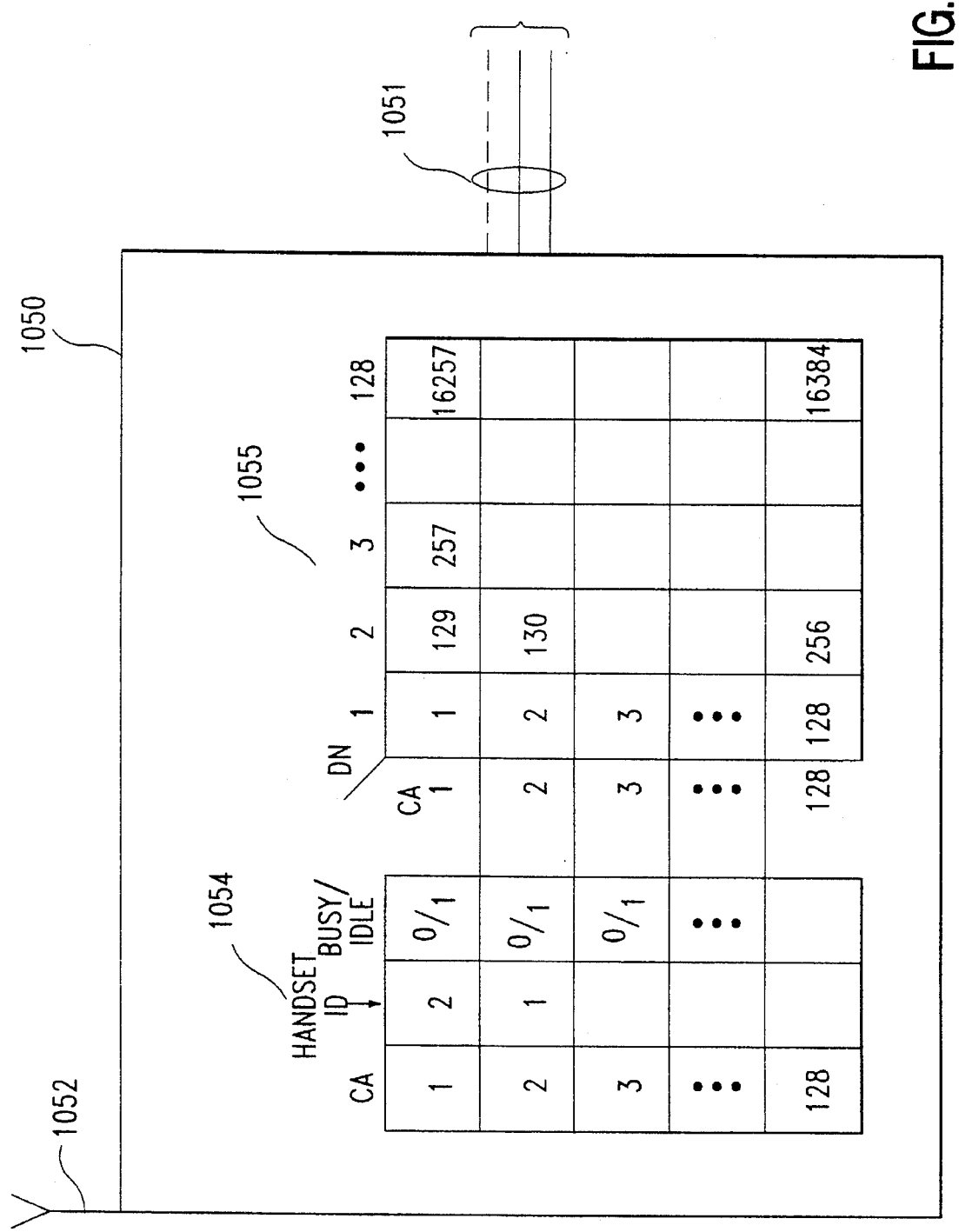
FIG. 11 depicts the two tables utilized by the base station to map DNs to call appearance identifiers, and call appearances to handset identifiers as well as the busy/idle status of the call appearances.

By way of overview, it is supposed that user 1020 calls a CACH-type DN served by the base station 1050 and both handsets are idle. Base station 1050 is arranged with a table to map call appearances to handset ID's and to track the busy/idle status of the call appearances. The table may be implemented in a RAM-type memory device, and a pictorial representation of the required mapping is depicted by device 1054 in FIG. 11, wherein it is shown that the first call appearance is associated with handset ID 2 (i.e., handset 1042) and the second call appearance is associated with handset ID 1 (i.e., handset 1041); the busy/idle status of a call appearance/handset is marked by 1/0, respectively. One other table is also implemented in base station 1050, and this table maps DNs to call appearances. Again the table may be implemented in a RAM-type memory device, and a pictorial representation of the required mapping is depicted by device 1055 in FIG. 11. This table is necessary since there are a total of 128 DNs per EKTS Terminal Service Profile, and the total number of call appearances per DN is 128—thus the call appearance identifier is a unique number between 1 and 16,384 across all DNs (recall the call appearance identifier is provided as part of the BRI bit stream to uniquely identify the assignment/location of each call appearance). For instance, if it is presumed that the second available DN is assigned to base station 1050, then the call appearance identifier ranges over the values 129 to 256. In the example of calling user 1020 placing a call to handset 1042, the call appearance identifier, as deduced from tables 1054 and 1055, is the unique number 129. Upon the appearance of an incoming call, switch 1014 receives the DN and associates a call appearance to the incoming DN, and then sends a message to base station 1050 with the call appearance identifier—in this example, it is assumed that call appearance identifier=129 (i.e., DN=2 and CA=1) is assigned. Base station 1050, from its table information as listed in FIG. 11, signals handset 1042 which is associated with the first call appearance for this particular base station. It is further supposed that the 'roving' user of handset 1042 answers this call; the status of this handset is marked as busy in table 1054 of FIG. 11.

Continuing with the example, if it is further assumed that user 1021 now places a call to the DN assigned to base station 1050. Since the first call appearance of the DN is busy, but the second call appearance is idle, that is, handset 1041 is also idle, the call can be completed to the 'roving' user of handset 1041 over the radio frequency channel assigned to handset 1041. Table 1054 can now be updated to show the second call appearance as being associated with handset 1041 (ID 1) and the status is marked as busy.

The following sequence of steps occurs to complete an incoming call to a wireless user; for illustrative purposes, it is presumed user 1020 desires to set-up a call to the DN assigned to base station 1050 (this sequence of steps is commensurate with the steps described in detail with respect to FIG. 7 in setting up a B-channel between a calling ISDN telephone and EKTS user A—accordingly, the following sequence may be set forth with some brevity due to these previous teachings):

(a) calling user 1020 transmits a 'SETUP' message including the called user DN to CO 1014;

(b) CO 1014 responds by sending a 'SETUP' message to base station 1050 via interface 1011 with call appearance identifier 129, which is then associated with handset 1042 from the information in table 1054;

(c) base station 1050 broadcasts the call attempt by propagating a radio signal over antenna 1052 for detection by handset 1042;

(d) since it is presumed that a roving user answers the incoming call on handset 1042, handset 1042 responds to the call with appropriate response message (in terms of a layer 3 signaling message, this activity produces 'CONNECT' message being transmitted from base station 1050, via CO 1014, to calling user 1020 with call appearance identifier 129);

(e) after suitable 'CONNECT ACKNOWLEDGE' and 'KEY HOLD' messages have been interchanged (see FIG. 7), a B-channel interconnects base station 1050, and in turn, handset 1042 to calling user 1020; and (f) an appropriate table entry is made in table 1054 to update the status of handset 1042 to busy.

If it is presumed that one of the handsets (say handset 1042) is already in busy, and another user (say user 1021) calls the given DN, to following sequence of steps occurs:

(a) calling user 1021 transmits a 'SETUP' message including the called user DN to CO 1014;

(b) CO 1014 responds by sending a 'SETUP' message to base station 1050 via interface 1011 with call appearance identifier 130, which is then associated with handset 1041 from the information in table 1054;

(c) base station 1050 broadcasts the call attempt by propagating a radio signal over antenna 1052 for detection by handset 1041;

(d) the roving user of handset 1041 answers the incoming call on handset 1041 so that handset 1041 responds to the call with appropriate response message (in terms of a layer 3 signaling message, this activity produces 'CONNECT' message being transmitted from base station 1050, via CO 1014, to calling user 1021 with call appearance identifier 130);

(e) after suitable 'CONNECT ACKNOWLEDGE' and 'KEY HOLD' messages have been interchanged (see FIG. 7), a B-channel interconnects base station 1050, and in turn, handset 1041 to calling user 1021; and (f) an appropriate table entry is made in table 1054 to update the status of handset 1041 as busy.

It is worthwhile to point out that both switch 1014 and base stations 1050 and 1070 maintain the same information about call appearances; the so-called local copy in the base stations is maintained to provide local information, e.g., information used for turning-on and turning-off red-and-green key lights, as well as the correspondence between call appearances and associated handsets.

Whereas the foregoing example has focused on the reception of a call from user 1020, it is also feasible for either user of a handset to originate an outgoing call to called user 1020. The sequence of messages is as follows for handset 1041:

(a) handset 1041 transmits a radio signal from its antenna 1044 to antenna 1052 of base station 1050. This radio signal conveys the call appearance identifier associated with handset 1041 (as available from table 1054) as well as the telephone number of called user 1020;

(b) base station 1050 converts this request for call-set up to the ISDN format, that is, a 'SETUP' message is sent from base station 1050 to CO 1014 and, in turn, another 'SETUP' message is sent from CO 1014 to called user 1020—the combined effect of these two signaling messages is a 'SETUP' message emanating from interface 1011;

(c) as discussed previously with respect to FIG. 8, CO 1014 receives 'CALL PROCEEDING' and 'ALERTING' messages from called user 1020, CO 1014 transmits 'CALL PROCEEDING' and 'ALERTING' messages to base station 1050; and (d) once called user 1020 answers the incoming call, a B-channel is established between handset 1041, via base station 1050, and called user 1020 after the following series of 'CONNECT' and 'CONNECT ACKnowledge' messages is passed:

called user 1020 transmits a 'CONNECT' message to CO 1014 which responds with a 'CONNECT ACKnowlege' message, and CO 1014 sends 'CONNECT' messages to base station 1050 and the base station responds with a 'CONNECT ACKnowlege' message.

Figure 12:
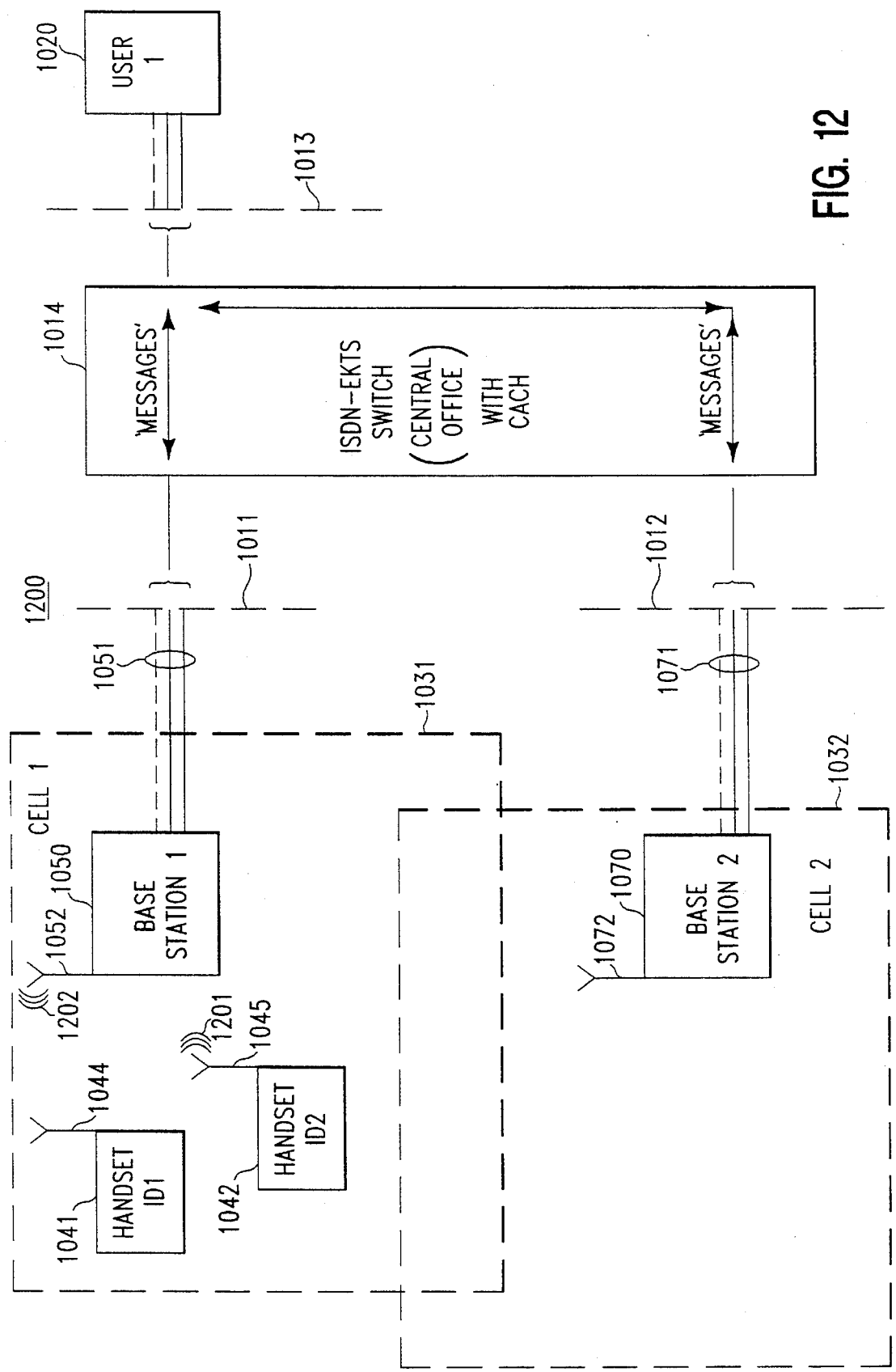
FIG. 12 illustrates the arrangement to enable the communication connection between an incoming calling user and a roaming handset in a cellular environment.

The foregoing discussion has focused on a single base station serving a plurality of roamer handsets; however, in a more typical roamer environment, there are a plurality of base stations serving the roamer handsets, and as a roving user of a handset moves from the signal propagation range of one base station into the range of another base station, handoff of the on-going call must be effected. A pictorial representation of such a situation is shown in FIG. 12, wherein the layouts of FIGS. 9 and 10 are combined to provide an example of system 1200 which includes two cells 1031 and 1032 served by base stations 1050 and 1070, respectively. Each base station is presumed to have multiple call appearances of the same DN (such as '5210' of terminal 642 in FIG. 9).

By way of extending the single base station example, the operation of system 1200 of FIG. 12 is now discussed for the situation in which incoming calling user 1020 initiates a call set-up to roving handsets 1041 or 1042 associated with the same DN; both handsets are assumed to be idle. The following sequence of steps occurs to complete this call set-up (this sequence of steps is commensurate with the steps described in detail with respect to FIG. 7 in setting up a B-channel between a calling ISDN telephone and EKTS user A as well as with respect to FIG. 10 just described—accordingly, the following sequence may be set-forth with some brevity due to these previous teachings):

(a) calling user 1020 transmits a 'SETUP' message including the called user DN to CO 1014;

(b) CO 1014 responds by sending 'SETUP' messages to base stations 1050 and 1070 via interfaces 1011 and 1012, respectively; it is presumed that the first call appearance is assigned to handle the incoming call, so the 'SETUP' message includes call appearance identifier=129;

(c) base station 1050, upon reference to its mapping tables (i.e., tables exemplified by tables 1054 and 1055 of FIG. 11) broadcasts the call attempt by propagating a radio signal over antenna 1052; similarly, base station 1070, upon reference to its mapping tables, broadcasts the call attempt by propagating a radio signal over antenna 1072;

(d) since it is presumed that handset 1042 is assigned the call appearance identifier=129, handset 1042 in cell 1031 answers the call by propagating radio signal from its antenna 1045 (in terms of a layer 3 signaling message, this activity produces 'CONNECT' message being transmitted from base station 1050, via CO 1014, to calling user 1020); and (e) after suitable 'CONNECT ACKNOWLEDGE' and 'KEY HOLD' messages have been interchanged (see FIG. 7), a B-channel interconnects handset 1042 to calling user 1020; this is indicated by signals 1201 and 1202 associated with antennas 1045 and 1052, respectively.

HANDOFF OF A STABLE CALL

Figure 13:
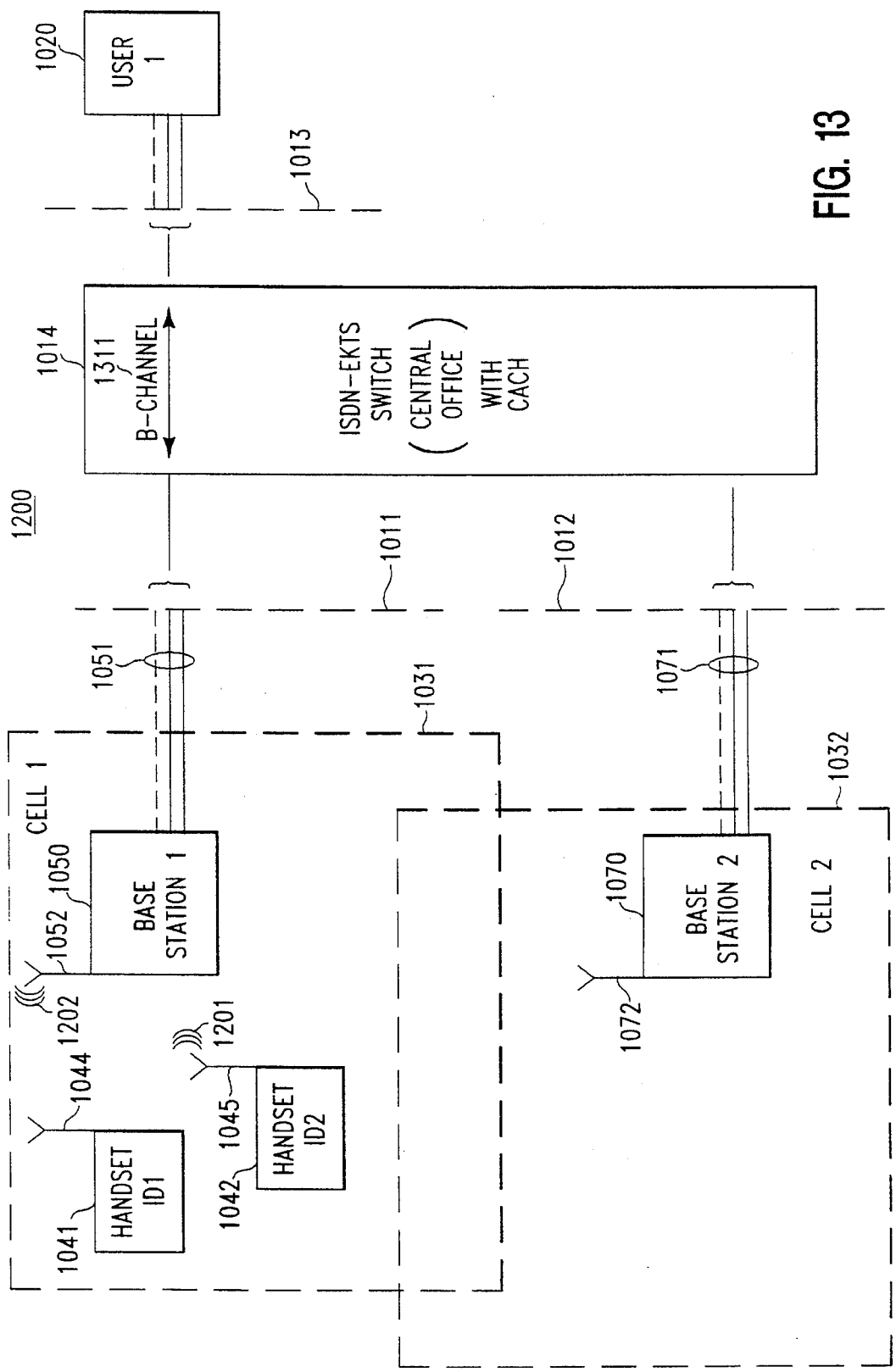
FIG. 13 illustrates an arrangement for a stable communication connection between a roaming handset and another user.
Figure 14:
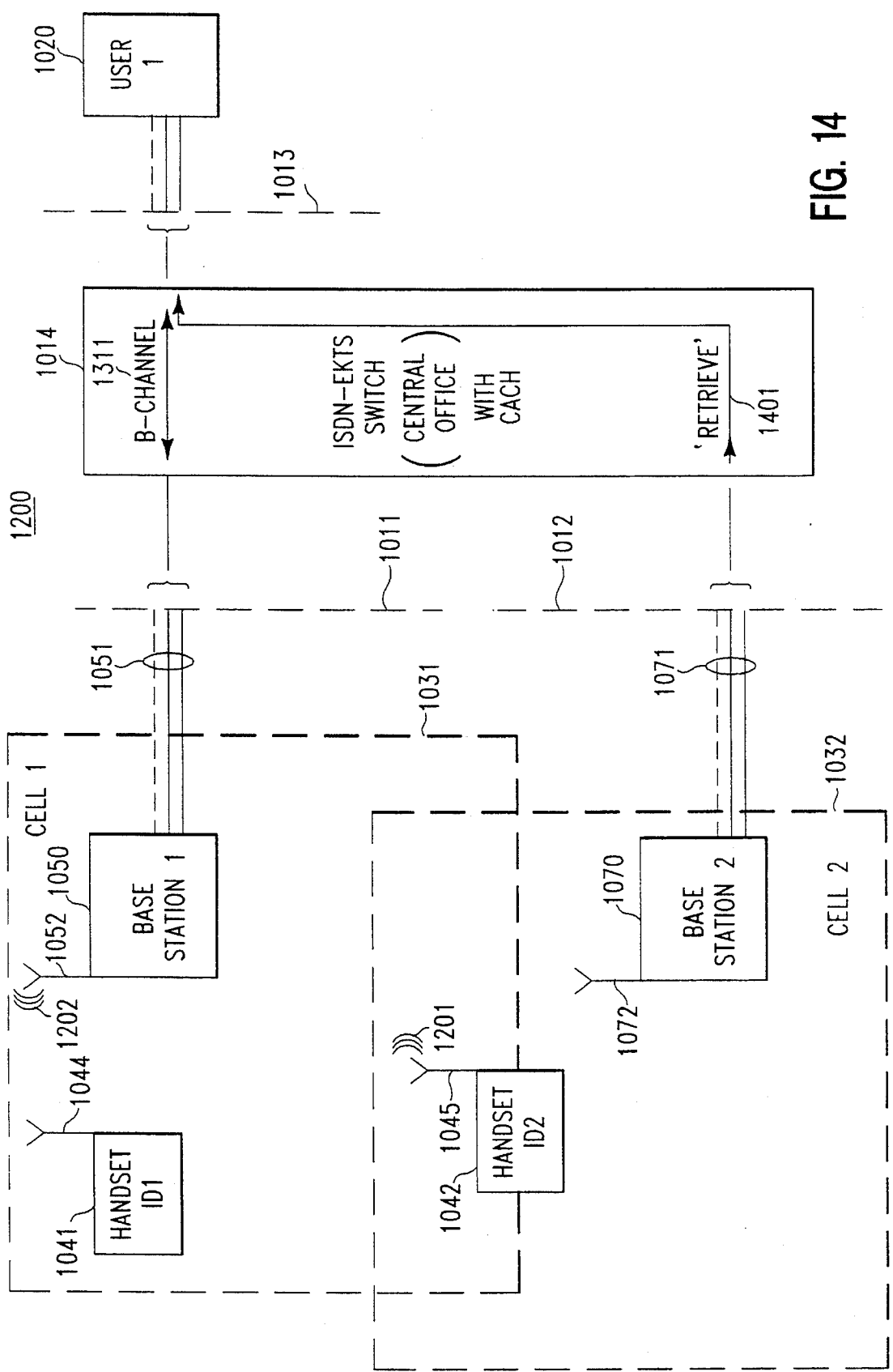
FIG. 14 illustrates the arrangement to initialize handoff of the stable call from an original CACH base station in one cell to a secondary CACH base station in another cell.
Figure 15:
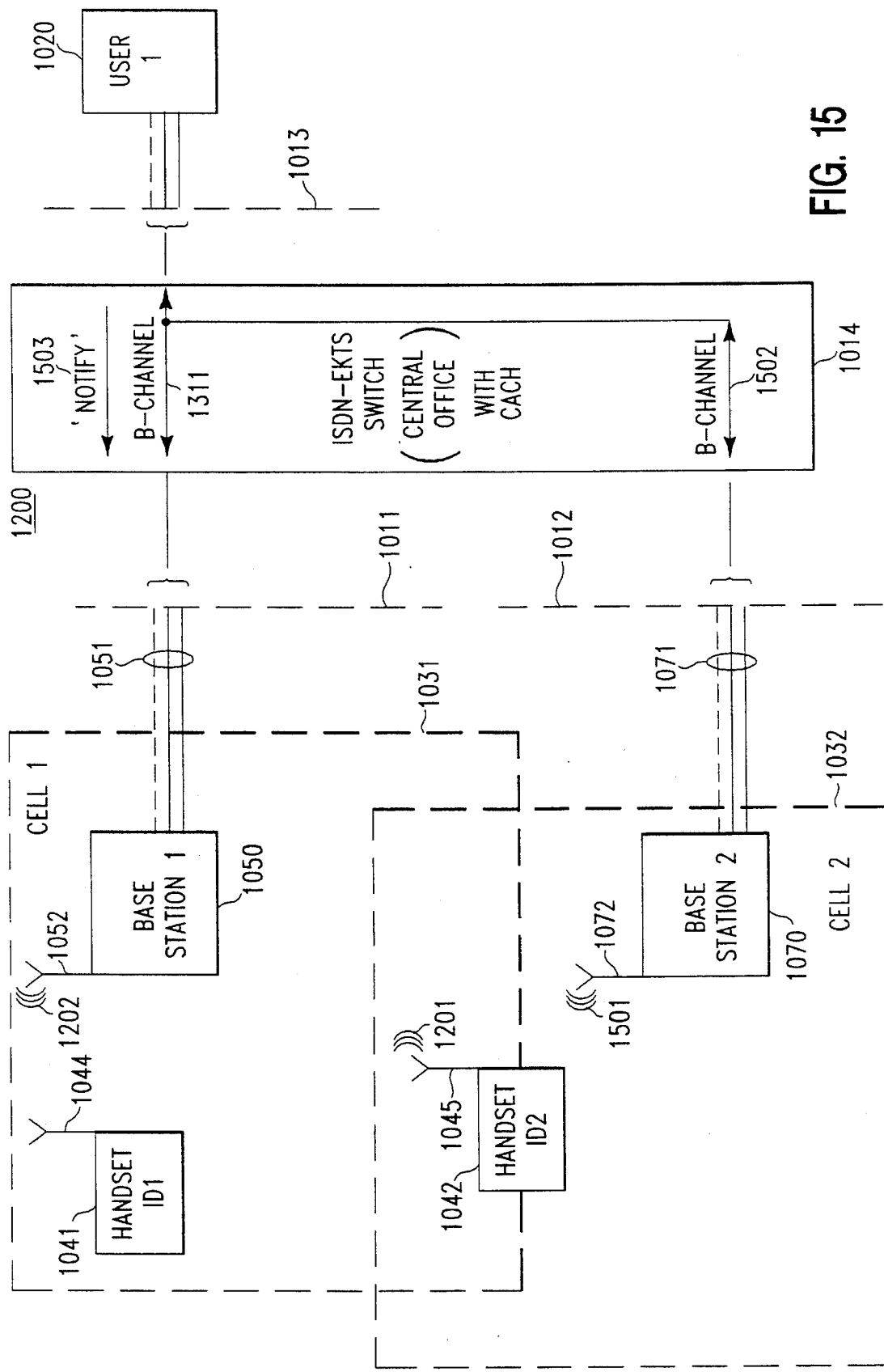
FIG. 15 illustrates the arrangement of an established three-way call to effect the handoff of the stable call to the secondary cell.
Figure 16:
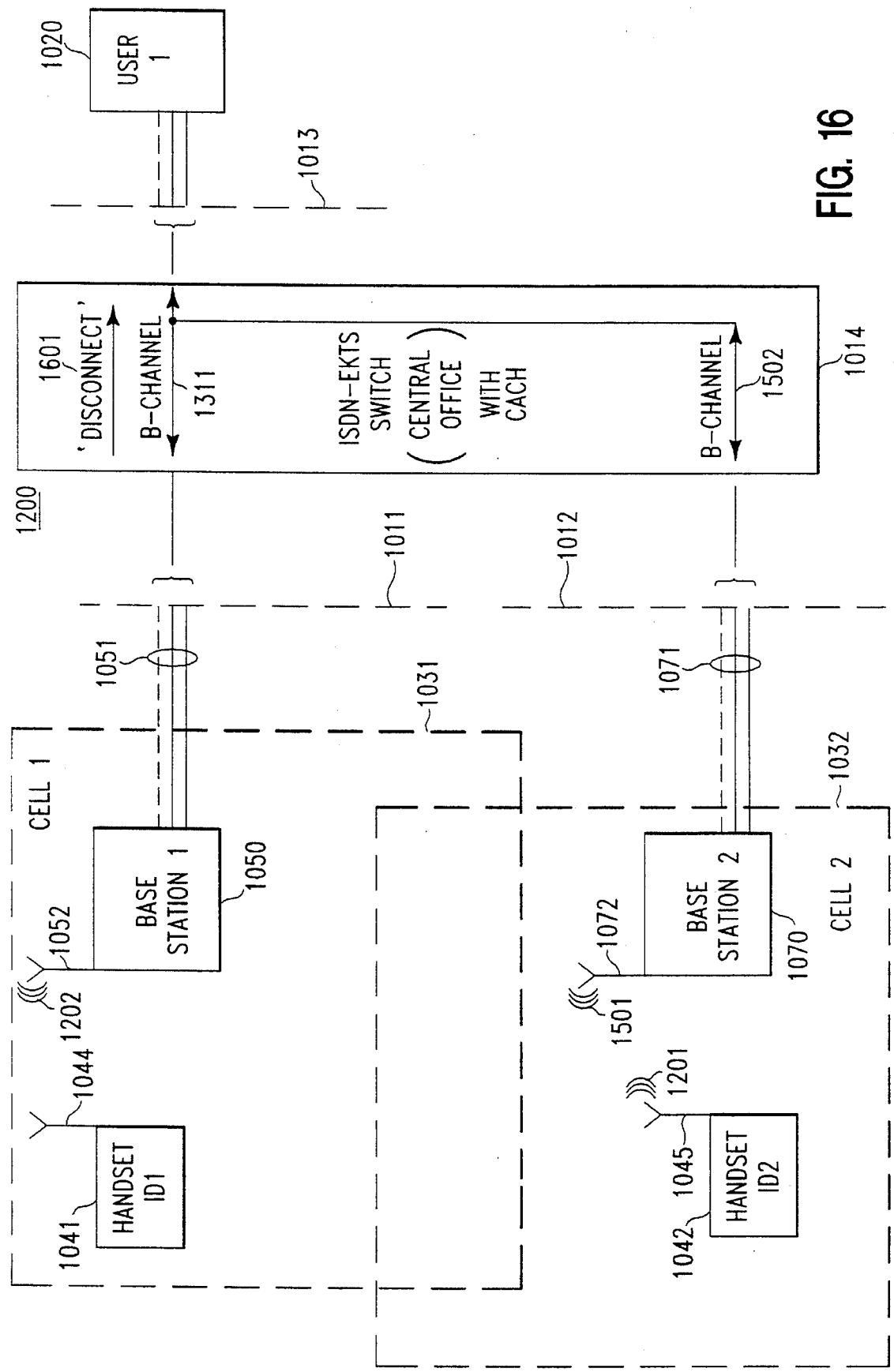
FIG. 16 illustrates the arrangement wherein the original base station releases the stable call.
Figure 17:
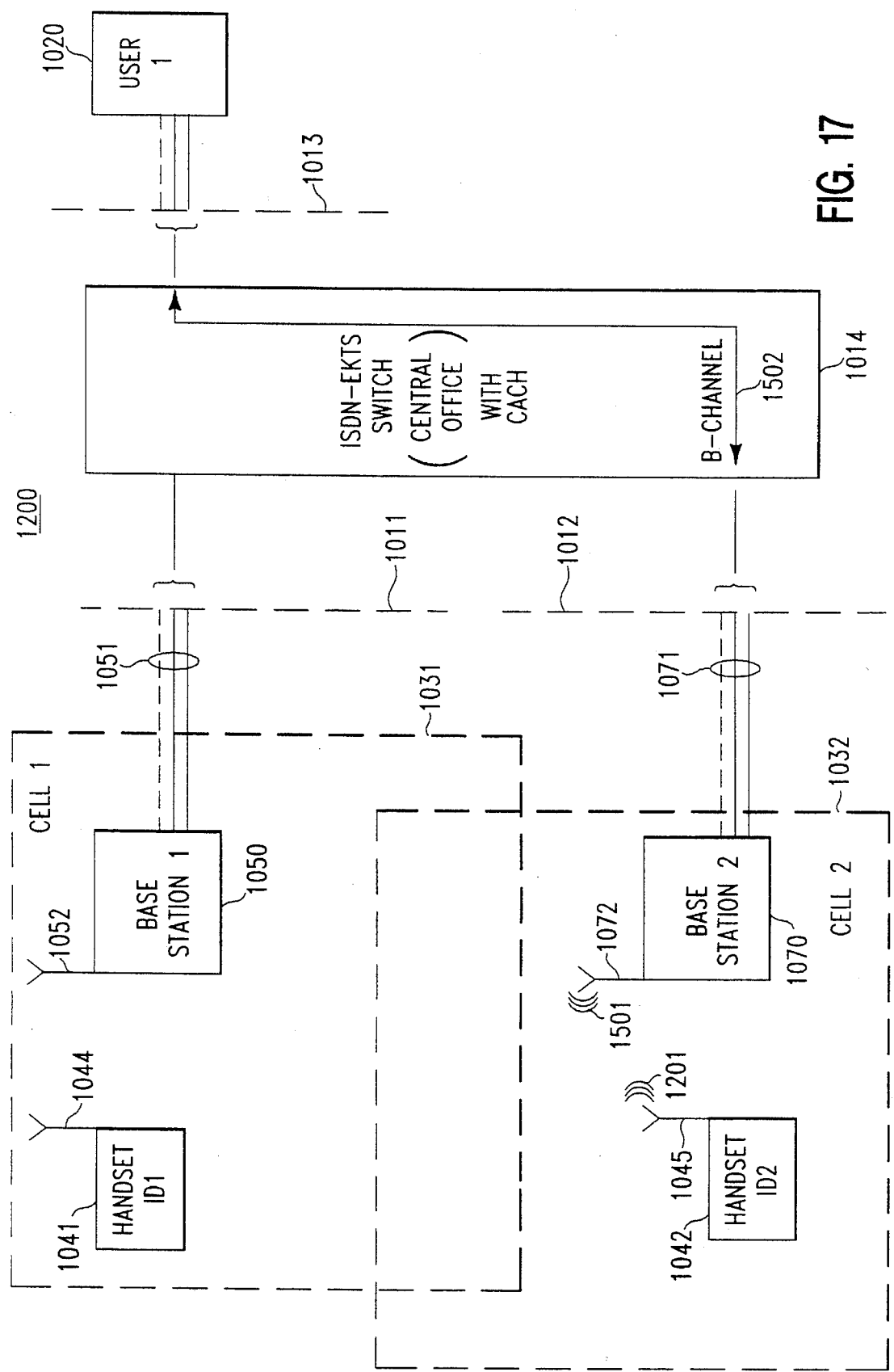
FIG. 17 illustrates a re-configured arrangement for the stable communication connection wherein the secondary base station now handles the connection between the secondary base station and the other user.

As alluded to above, it is necessary in any practical roamer environment to effect a handoff of an on-going call from one base station to another as the roaming user crosses the boundary from an original cell to a secondary cell. This aspect of the invention is presented with reference to FIGS. 13–17. Referring now to FIG. 13, there is shown again basic system 1200 as originally depicted in FIG. 12. As is depicted in FIG. 13, the starting point for the immediate discussion is the presumption that a stable communication connection over a B-channel has been established between a roaming user and another user—as illustrated, B-channel 1311 connects handset 1042 and other user 1020. The communication connection may have been established by the procedure discussed in the preceding section. The following sequence of steps occurs to maintain the communication connection as handset 1042 migrates from cell 1031 to cell 1032 (this sequence of steps is commensurate with the steps described in detail with respect to FIG. 8, with special emphasis on the bridging procedures associated with user B bridging onto the call, and then user A dropping off the call, as well as the CACH feature described with respect to FIGS. 10 and 12—accordingly, the following sequence may be set forth with some brevity due to these previous teachings):

(a) initially, base station 1050 transceives with handset 1042 to provide B-channel 1311 information both to and from handset 1042. However, during D-channel set-up of the B-channel, the same EKTS-CACH call appearances at the other base stations have cycled through a sequence of 'KEY SETUP', 'KEY SETUP ACKnowledge', 'CONNECT', and 'CONNECT ACKnowledge' messages, and each call appearance is, in essence, in a standby mode and is available to be bridged;

(b) with reference now to FIG. 14, when handset 1042 migrates to a region encompassed by both cell 1031 and 1032, that is, the overlap of cell 1031 with cell 1032, base station 1070 detects the radio signal propagated by handset 1042 and base station 1070 then generates a request to switch 1014 to bridge onto the call for the call appearance associated with handset 1042. This desired activity is shown by 'RETRIEVE' signaling message 1401 being issued over the D-channel of BRI 1071;

(c) with reference now to FIG. 15, base station 1050 receives 'NOTIFY' signaling message 1503 as a result of the previous 'RETRIEVE' signaling message, and B-channel 1502 of BRI 1071 is bridged onto the call. Now handset 1042 receives radio signal 1202 from base station 1050, and duplicative radio signal 1501 from base station 1070, as B-channel information. Base station 1050 also interprets this 'NOTIFY' message as an indication that handset 1042 has migrated from the original cell 1031 to the secondary cell 1032, and that the base station associated with the secondary cell desires to take control of the communication connection;

(d) with reference now to FIG. 16, base station 1050 issues 'DISCONNECT' message 1601 over the D-channel of BRI 1051 to drop B-channel 1311 and place base station 1050 in standby mode; and (e) finally, with reference to FIG. 17, after base station 1050 drops its B-channel, only B-channel 1502 in BRI 1071 associated with base station 1070 remains as the communication connection between handset 1042 and other user 1020. Now, only radio signal 1201 is detected by antenna 1072 of base station 1070, and handset 1042 receives only radio signal 1501 from base station 1070.

BASE STATION CIRCUITRY

Figure 18:
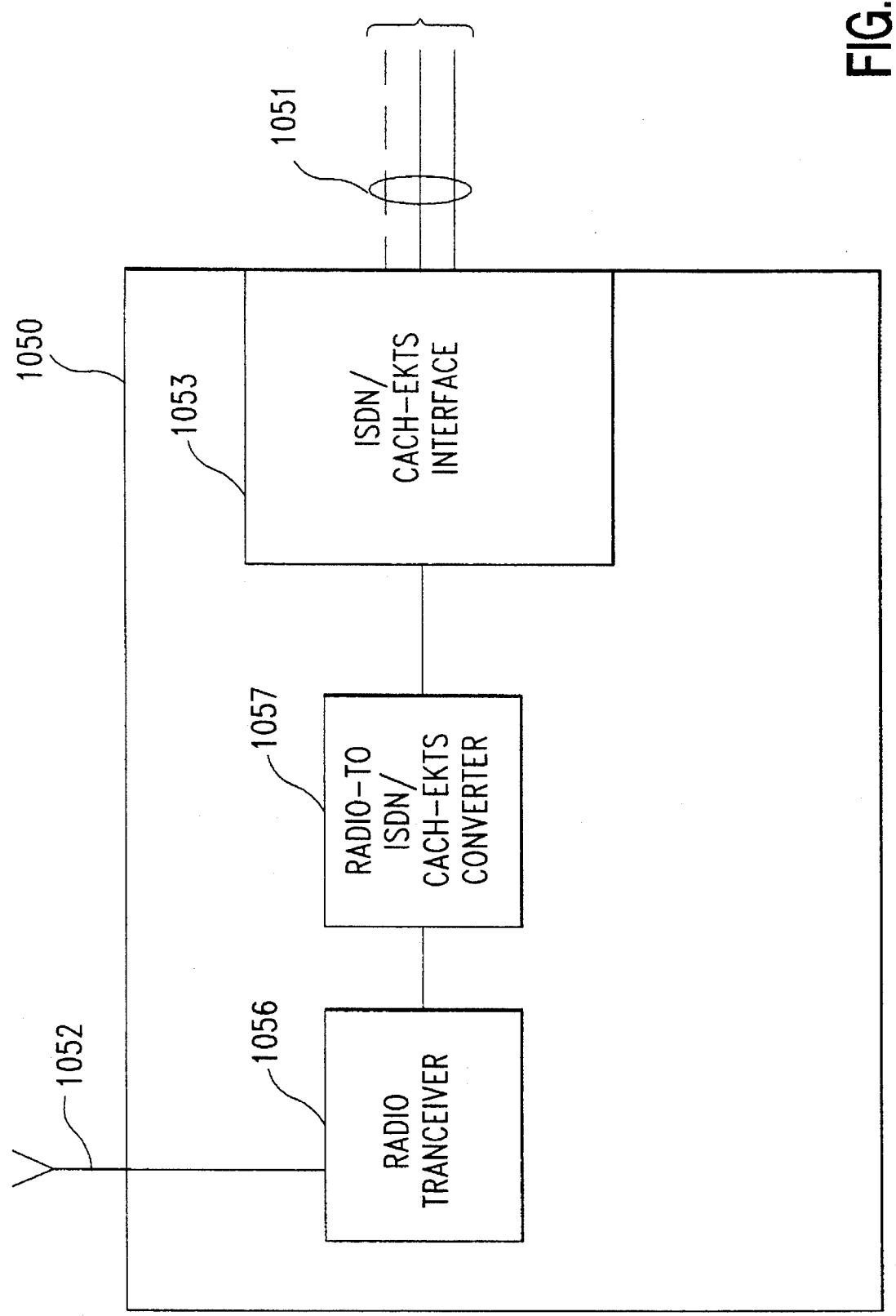
FIG. 18 is a high-level block diagram of a base station for transceiving radio signals from a mobile user and transceiving ISDN D-channel signaling messages and B-channel information.

In the discussion of FIG. 10, the functions required of base station 1050 have been set forth with some generality. To complete the detailed description, FIG. 18 depicts a high-level block diagram of an illustrative arrangement of base station 1050 to provide the required functionality. In FIG. 18, base station 1050 is composed of radio transceiver 1056, with associated antenna 1052, ISDN/CACH-EKTS interface 1053, and interposed radio-ISDN/EKTS converter 1057. Radio transceiver 1056 serves as a radio port to both receive incoming radio signals from the roving users and transmit outgoing radio signals from the base station. Interface 1053 serves as a termination port for BRI 1051. Since information arriving on the D- and B-channels of BRI 1051 is digital in nature, and radio signals are generally analog in nature and appear at an allocated region of the frequency spectrum, converter 1040 serves to convert the digital information from interface 1053 to commensurate radio signals for transceiver 1056 and vice versa.

PCS ENVIRONMENT

In a conventional cellular system as described to this point, the movement of a handset is detected by the base station tracking the location of the handset. However, for Personal Communication Service ("PCS"), the tracking is effected by the handset, that is, the handset is arranged with circuitry and appropriate logic to determine if and when a change of cells is required. This determination is accomplished by arranging each base station for continuous propagation of a cell identifier that informs the handsets within the cell of which base station serves that corresponding cell.

To further elaborate on how this determination is accomplished, it is important to understand that a PCS serving area or cellular region is served by a frequency spectrum, and this spectrum is subdivided into frequency bands. Each band serves a different base station so that neighboring cells will have different frequency bands. Within each band, a number of channels is provided via Time Division Multiplexing (TDM) and the channels are shared among all the handsets in a given cell. Each handset runs two on-going quality processes. The first process involves a quality check on the operating channel to determine the quality of the reception relative to a threshold. If the quality falls below a threshold, the handset will look for another channel within the band to switch to. If it finds one, a negotiation takes place between the handset and base station to effect a transfer of the present channel to a channel with better quality. The second process involves a quality check on the entire band. If the reception degrades to the point where the handset is receiving another base station signal with better quality as measured relative to a threshold, the given handset initiates a message in the band of the other base station to see if there is an open channel. If so, the handset emits an automatic link transfer command to have the latter base station switch the communication connection to the open channel. Thus, the handset monitors both quality cycles constantly and whenever the handset detects that there is a better band and channel available, the handset will request from the base station that owns the resources (band and channel) to change to that resource.

Figure 19:
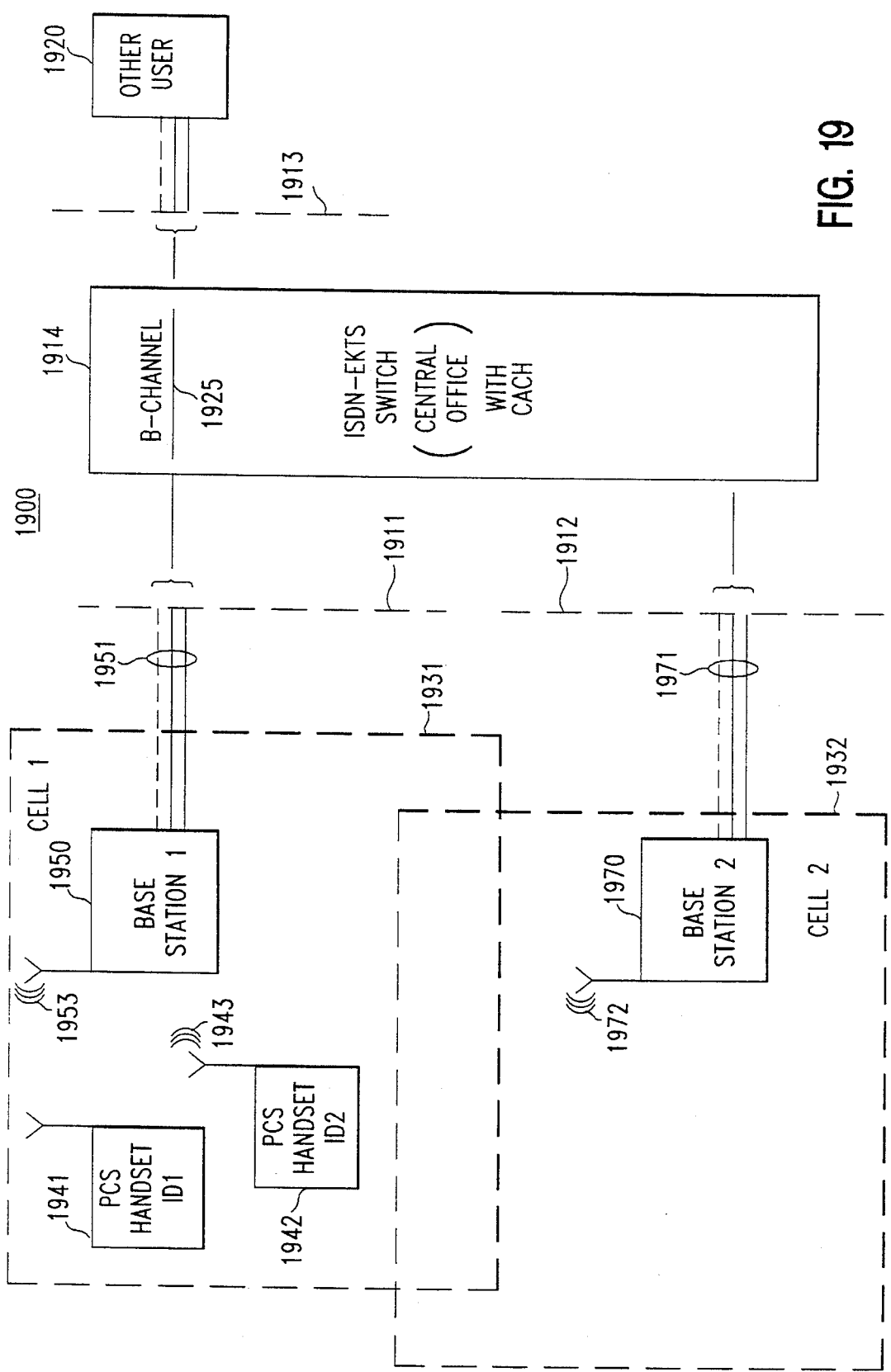
FIG. 19 illustrates an arrangement of base stations, switching office and handsets in a PCS environment.

In accordance with the present invention, each DN is assigned to every base station so that every cell serves every DN. When a call is active, the communication connection is carried by one of the channels within a band. To further describe the PCS environment, reference is made to FIG. 19, which illustrates an established communication connection from PCS handset 1942 to other user 1920 over B-channel 1925. The primary difference between FIG. 19 and the previous FIGS. 12–17 resides in the coordinated operation of PCS handsets 1941 and 1942, and base stations 1950 and 1970. As discussed above, all base stations continuously emit a radio signal to enable the handsets to monitor the quality of the reception and negotiate a change of band or channel or both when the quality of the active band or channel degrades. This continuous signal propagation is depicted by signals 1953 and 1972 emitted from base stations 1950 and 1970, respectively. In the depiction of FIG. 19, PCS handset 1942 is transceiving with base station 1950 because, presumably, the quality of the band assigned to base station 1950 is acceptable at the moment, that is, is above a pre-determined quality threshold. As handset 1942 migrates toward base station 1970, that is, from cell 1031 towards cell 1032, then the quality of the reception in the band assigned to base station 1970 will, at some point, be better than the reception in the band assigned to base station 1950, and a handoff will occur. The sequence of D-channel messages and the final B-channel communication connection may be described in a manner similar to the description of FIGS. 13–17.

HANDOFF OF A STABLE CALL—PCS

With reference to FIG. 19, the starting point for the immediate discussion is the presumption that a stable communication connection over a B-channel has been established between PCS handset and another user—as illustrated, B-channel 1925 connects handset 1942 and other user 1920. The communication connection may have been established by a procedure similar to service provisioning for either incoming or outgoing calls described above. The following sequence of steps occurs to maintain the communication connection as handset 1942 migrates from cell 1031 to cell 1032 (this sequence of steps is commensurate with the steps described in detail with respect to FIG. 8 and FIGS. 13–17, with special emphasis on the bridging procedures associated with user B bridging onto the call, and then user A dropping off the call—accordingly, the following sequence may be set forth with some brevity due to these previous teachings):

(a) initially, base station 1950 transceives with handset 1942 to provide B-channel 1925 information both to and from handset 1942. However, recall from FIG. 8 that during D-channel set-up of the B-channel, the same EKTS-CACH call appearances have cycled through a sequence of 'KEY SETUP', 'KEY SETUP ACKnowledge', 'CONNECT', and 'CONNECT ACKnowledge' messages, and each call appearance is, in essence, in a standby mode and is available to be bridged;

(b) when handset 1942 migrates to a region encompassed by both cell 1031 and 1032, that is, the overlap of cell 1031 with cell 1032, the radio signal propagated by base station 1970 is detected by handset 1942 and a quality process is executed by handset 1942 to determine if a request to transfer to base station 1970 is appropriate based on quality threshold comparisons. If it is determined that base station 1970 will provide a better quality communication connection, then handset 1942 emits a automatic link transfer command. This is interpreted by base station 1970 as a request to 'RETRIEVE' the call—the 'RETRIEVE' message includes call appearance identifier information;

(c) base station 1950 receives a 'NOTIFY' signaling message as a result of the previous 'RETRIEVE' signaling message, and a B-channel of BRI 1971 is bridged onto the call. Now handset 1942 receives radio signal 1953 from base station 1950, and duplicative radio signal 1972 from base station 1970, as B-channel information. In one implementation of the present invention, base station 1950 is instructed to interpret this 'NOTIFY' message as an indication that handset 1942 has migrated from the original cell 1031 to the secondary cell 1032, and that the base station associated with the secondary cell desires to take control of the communication connection;

(d) base-station 1950 issues a 'DISCONNECT' message over the D-channel of BRI 1951 to drop B-channel 1925 and place base station 1950 in standby mode; and (e) after base station 1950 drops its B-channel, only a B-channel in BRI 1971 associated with base station 1970 remains as the communication connection between handset 1942 and other user 1920.

Although embodiments which incorporate the teachings of the present invention have been shown and described in detail herein, those skilled in the art can readily devise many other varied embodiments that still incorporate these teachings. For instance, since the environment of the present invention does not necessarily require the use of the public telephone network nor is it necessary to utilize a central office based switching network, one with ordinary skill in the art may now readily understand how the teachings of the present invention may be utilized in a Private Branch Exchange (PBX) environment since a PBX-based EKTS with a CACH feature uses similar mechanisms to 'SETUP' broadcasts, 'RETRIEVE', 'NOTIFY', and so forth. Thus, to encompass public telephone network, CENTREX, and PBX uses of CACH-EKTS, the terminology "central office" as used hereinafter is generic to these services and connotes a serving area covered by a single-switch office.

In addition, whereas the motivating example has discussed the subject matter of the present invention in terms of a warehouse employee, other business arrangements (e.g., boss/secretary) or residential arrangements (e.g., residential customer extensions) are readily contemplated.

Accordingly, it is to be understood that the above-described embodiment is simply illustrative of the application of the principles in accordance with the present invention. Such embodiments which may now be readily devised by those in the art may embody the principles in spirit, and such embodiments are limited only by the scope of the following claims.

We claim:

1. A method for handing off an established communication connection between a cellular mobile user and another user wherein cellular mobile users have access to a cellular network which covers a number of cells served by a corresponding number of base stations and wherein all of the base stations are connected to the same central office in an Integrated Services Digital Network (ISDN), the central office being further configured for providing Electronic Key Telephone Service (EKTS), having the Call Appearance Call Handling (CACH) feature, to the base stations, the CACH feature associating a plurality of call appearance identifiers with each EKTS directory number, the method comprising the steps of configuring each base station with a radio port to transceive radio signals with cellular users within the cell corresponding to each base station; with an ISDN-based CACH-EKTS port to transceive CACH-EKTS signaling messages and information with the central office via an access interface having a D-channel and a B-channel; and with a converter for converting between the radio signals and the EKTS signaling messages and information, associating each of the mobile users with one of the call appearance identifiers, in response to the cellular mobile user moving from an original cell served by an original base station to a secondary cell, detecting radio signals propagated by the cellular mobile user at a secondary base station covering the secondary cell, bridging the secondary base station on the established communication connection by transceiving D-channel protocol signaling messages with the central office to effect a three-way B-channel communication connection involving both the original and secondary base stations, the protocol signaling messages including one of the call appearance identifiers corresponding to the cellular mobile user, notifying the original base station using D-channel protocol signaling messages between the central office and the original base station of bridging the secondary base station, and disconnecting the original base station from the three-way B-channel communication connection to produce a two-way connection between the cellular mobile user and the other user, the two-way connection including a B-channel communication connection between the secondary base station and the central office.

2. The method as recited in claim 1 wherein the step of disconnecting to produce the two-way connection comprises the steps of converting B-channel information received at the secondary base station to outgoing radio information signals for transmission to the cellular mobile user and of converting incoming radio information signals received from the cellular mobile user to information compatible for transmission over the B-channel to the other user.

3. The method as recited in claim 1 further comprising the step of sending an EKTS 'KEY SETUP' D-channel message from the central office to the secondary base station for the established communication connection, wherein said step of bridging comprises the step of sending an EKTS 'RETRIEVE' D-channel message from the secondary base station to the central office, and wherein said step of notifying comprises the step of sending an EKTS 'NOTIFY' D-channel message from the central office to the original base station.

4. A method for handing off an established communication connection between a Personal Communication Service (PCS) cellular mobile user and another user wherein PCS cellular mobile users have access to a cellular network which covers a number of cells served by a corresponding number of base stations and wherein all of the base stations are connected to the same central office in an Integrated Services Digital Network (ISDN), the central office being further configured for providing Electronic Key Telephone Service (EKTS), having the Call Appearance Call Handling (CACH) feature, to the base stations, the CACH feature associating a plurality of call appearance identifiers with each EKTS directory number, the method comprising the steps of configuring each base station with a radio port to transceive radio signals with PCS cellular users within the cell corresponding to each base station, with an ISDN-based EKTS port to transceive EKTS signaling messages and information with the central office via an access interface having a D-channel and a B-channel, and with a converter for converting between the radio signals and the EKTS signaling messages and information, associating each of the PCS cellular mobile users with one of the call appearance identifiers, assigning each base station a unique base station identifier in order to permit each PCS cellular mobile user to identify each base station, as the PCS cellular mobile user moves from an original cell served by an original base station to a secondary cell served by a secondary base station, detecting radio signals propagated by the original base station and the secondary base station, measuring by the PCS cellular mobile user the quality of the reception from the original base station and from the secondary base station, whenever the quality of reception of the secondary base station is greater than the quality of reception of the original base station, initiating by the PCS cellular mobile user a request to transfer the established communication connection to the secondary base station, bridging the secondary base station on the established communication connection by transceiving D-channel protocol signaling messages with the central office to effect a three-way B-channel communication connection involving both the original and secondary base stations, the protocol signaling messages including one of the call appearance identifiers corresponding the PCS cellular mobile user, notifying the original base station using D-channel protocol signaling messages between the central office and the original base station of bridging the secondary base station, and disconnecting the original base station from the three-way B-channel communication connection to produce a two-way B-channel communication connection between the secondary base station and the central office.

5. The method as recited in claim 4 wherein the step of disconnecting to produce the two-way connection comprises the steps of converting B-channel information received at the secondary base station to outgoing radio information signals for transmission to the PCS cellular mobile user and converting incoming radio information signals received from the PCS cellular mobile user to information compatible for transmission over the B-channel to the other user.

6. The method as recited in claim 5 further comprising the step of sending an EKTS 'KEY SETUP' D-channel from the central office to the secondary base station for the established communication connection, wherein said step of bridging comprises the step of sending an EKTS 'RETRIEVE' D-channel message from the secondary base station to the central office, and wherein said step of notifying Comprises the step of sending an EKTS 'NOTIFY' D-channel message from the central office to the original base station.

7. Apparatus for handing off an established communication connection between a cellular mobile user and another user wherein cellular mobile users have access to a cellular network which covers a number of cells served by a corresponding number of base stations and wherein all of the base stations are connected to the same central office in an Integrated Services Digital Network (ISDN), the central office being further configured for providing Electronic Key Telephone Service (EKTS), having the Call Appearance Call Handling (CACH) feature, to the base stations, the CACH feature associating a plurality of call appearance identifiers with each EKTS directory number, the apparatus comprising means for configuring each base station with a radio port to transceive radio signals with cellular users within the cell corresponding to each base station, and with an ISDN-based CACH-EKTS port to transceive CACH-EKTS signaling messages and information with the central office via an access interface having a D-channel and a B-channel, said means for configuring including means for converting to convert between the radio signals and the EKTS signaling messages and information, means for associating each of the mobile users with one of the call appearance identifiers, means, responsive to the cellular mobile user moving from an original cell served by an original base station to a secondary cell, for detecting radio signals propagated by the cellular mobile user at a secondary base station covering the secondary cell, means, responsive to said means for detecting, for bridging the secondary base station on the established communication connection by transceiving D-channel protocol signaling messages with the central office to effect a three-way B-channel communication connection involving both the original and secondary base stations, means, responsive to said means for detecting, for notifying the original base station using D-channel protocol signaling messages between the central office and the original base station of bridging the secondary base station, the protocol signaling messages including the corresponding one of the call appearance identifiers associated with the cellular mobile user, and means, responsive to said means for detecting, for disconnecting the original base station from the three-way B-channel communication connection to produce a two-way connection between the cellular mobile user and the other user, the two-way connection including a B-channel communication connection between the secondary base station and the central office.

8. Apparatus for handing off an established communication connection between a Personal Communication Service (PCS) cellular mobile user and another user wherein PCS cellular mobile users have access to a cellular network which covers a number of cells served by a corresponding number of base stations and wherein all of the base stations are connected to the same central office in an Integrated Services Digital Network (ISDN), the central office being further configured for providing Electronic Key Telephone Service (EKTS), having the Call Appearance Call Handling (CACH) feature, to the base stations, the CACH feature associating a Plurality of call appearance identifiers with each EKTS directory number, the apparatus comprising means for configuring each base station with a radio port to transceive radio signals with PCS cellular users within the cell corresponding to each base station, and with an ISDN-based CACH-EKTS port to transceive CACH-EKTS signaling messages and information with the central office via an access interface having a D-channel and a B-channel, said means for configuring including means for converting between the radio signals and the EKTS signaling messages and information, each base station having a unique identifier in order to permit each PCS cellular mobile user to identify each base station, means for associating each of the mobile users with one of the call appearance identifiers, means, responsive to the PCS cellular mobile user moving from an original cell served by an original base station to a secondary cell served by a secondary base station, for detecting radio signals propagated by the original base station and the secondary base station, means for measuring by the PCS cellular mobile user the quality of the reception from the original base station and from the secondary base station, means, responsive to said means for measuring, for initiating by the PCS cellular mobile user a request to transfer the established communication connection to the secondary base station whenever the quality of reception of the secondary base station is greater than the quality of reception of the original base station, means, responsive to said means for initiating, for bridging the secondary base station on the established communication connection by transceiving D-channel protocol signaling messages with the central office to effect a three-way B-channel communication connection involving both the original and secondary base stations, the protocol signaling messages including one of the call appearance identifiers corresponding to the PCS cellular mobile user, means, responsive to said means for bridging, for notifying the original base station using D-channel protocol signaling messages between the central office and the original base station of bridging the secondary base station, and means, responsive to said means for notifying, for disconnecting the original base station from the three-way B-channel communication connection to produce a two-way B-channel communication connection between the secondary base station and the central office.

* * * * *